(12) United States Patent
Lafreniere et al.

(10) Patent No.: US 12,165,791 B2
(45) Date of Patent: *Dec. 10, 2024

(54) LOW-PROFILE CABLE ARMOR

(71) Applicant: AFC Cable Systems, Inc., New Bedford, MA (US)

(72) Inventors: Peter Lafreniere, Mattapoisett, MA (US); Stephen Lundgren, Marion, MA (US); Paulo Damoura, Dorchester, MA (US); Ronald Pegg, New Bedford, MA (US); Antonio Araujo, New Bedford, MA (US); David Campbell, Bristol, RI (US)

(73) Assignee: AFC Cable Systems, Inc., New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,321

(22) Filed: Jan. 27, 2023

(65) Prior Publication Data

US 2023/0178266 A1 Jun. 8, 2023

Related U.S. Application Data

(63) Continuation of application No. 17/493,173, filed on Oct. 4, 2021, now Pat. No. 11,587,699, which is a continuation-in-part of application No. 17/408,629, filed on Aug. 23, 2021, now Pat. No. 11,282,619, which is a continuation of application No. 16/578,842, filed on Sep. 23, 2019, now Pat. No. 11,101,056.

(51) Int. Cl.
*H01B 7/22* (2006.01)
*H01B 7/04* (2006.01)

(52) U.S. Cl.
CPC ............... *H01B 7/226* (2013.01); *H01B 7/04* (2013.01)

(58) Field of Classification Search
CPC .......... H01B 7/226; H01B 9/025; F16L 11/16
See application file for complete search history.

(56) References Cited

U.S. PATENT DOCUMENTS

| | | |
|---|---|---|
| 1,134,119 A | 4/1915 | Gilson |
| 1,215,365 A | 2/1917 | Gilson |
| 1,819,175 A | 8/1931 | Edward |
| 1,908,063 A | 5/1933 | Schneider |
| 2,713,318 A * | 7/1955 | Paulstich ................ H03J 1/045 74/10 R |

(Continued)

*Primary Examiner* — Chau N Nguyen
(74) *Attorney, Agent, or Firm* — KDW FIRM PLLC

(57) ABSTRACT

Disclosed is a cable assembly including at least one conductor and a metal sheath disposed over the at least one conductor, the metal sheath including a continuous strip of metal having a plurality of revolutions. A first revolution of the plurality of revolutions may include a first section having a curved profile extending into an interior cavity of the metal sheath, and a second section extending from the first section, the second section extending along a lengthwise axis, wherein a length of the second section, along the lengthwise axis, is at least two times as large as a diameter of the first section when the metal sheath is in a linear configuration. The first revolution may further include a third section extending from the second section, the third section including a free end terminating within a recess defined by a curved profile of a first section of an adjacent revolution.

14 Claims, 24 Drawing Sheets

(56) References Cited

U.S. PATENT DOCUMENTS

| | | |
|---|---|---|
| 2,713,381 A | 7/1955 | Seck |
| 3,311,133 A | 3/1967 | Kinander |
| 3,330,303 A | 7/1967 | Fochler |
| 4,282,398 A | 8/1981 | Solomon |
| 4,733,629 A * | 3/1988 | Hunt ................ B29C 66/43 114/357 |
| 5,259,418 A | 11/1993 | Hamrick |
| 5,350,885 A | 9/1994 | Falciglia |
| 6,009,909 A | 1/2000 | Mantua |
| 6,127,632 A | 10/2000 | Oswald |
| 6,792,828 B2 | 9/2004 | Ishihara |
| 6,906,264 B1 | 6/2005 | Grant, Jr. |
| 8,278,554 B2 | 10/2012 | Dollins |
| 10,468,159 B1 | 11/2019 | Duan |
| 11,101,056 B1 | 8/2021 | Lafreniere |
| 11,282,619 B2 | 3/2022 | Lafreniere |
| 11,587,699 B2 * | 2/2023 | Lafreniere ........... H02G 3/0468 |
| 2013/0056105 A1 | 3/2013 | Graham |
| 2014/0238718 A1 | 8/2014 | Tanner |

\* cited by examiner

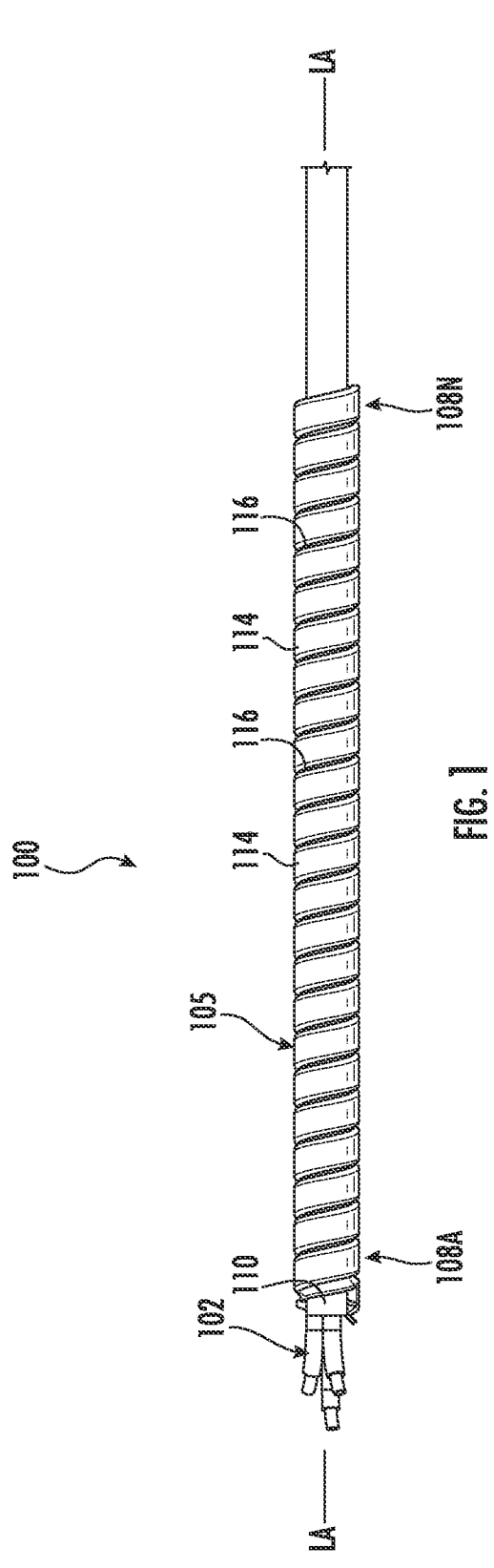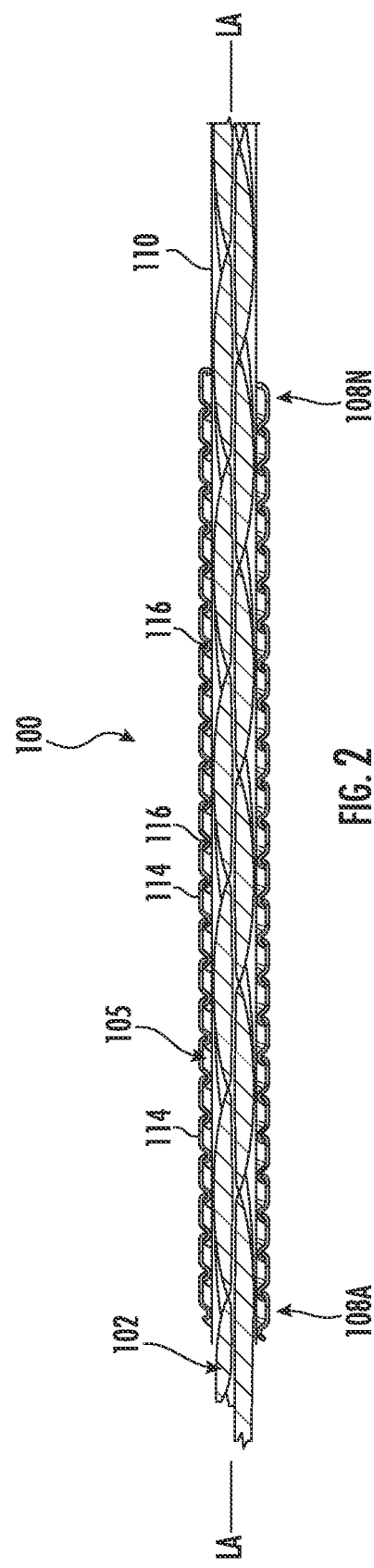

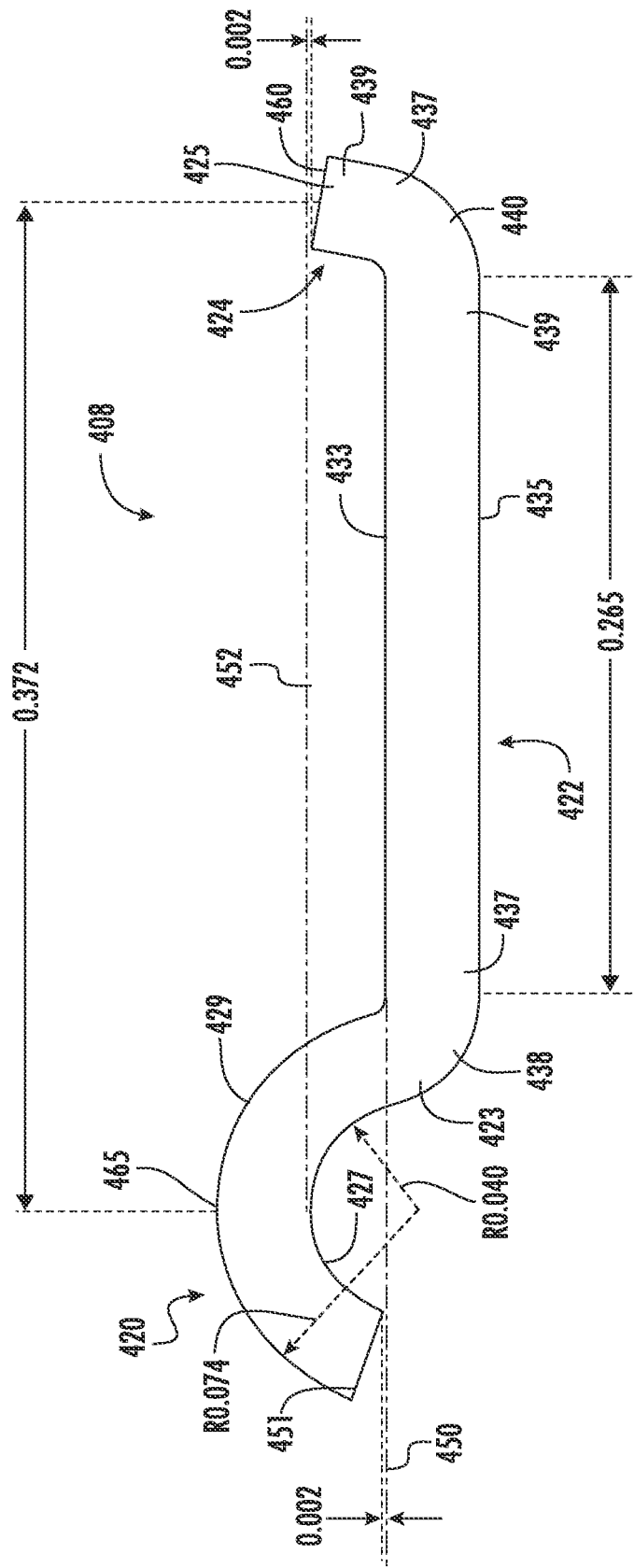

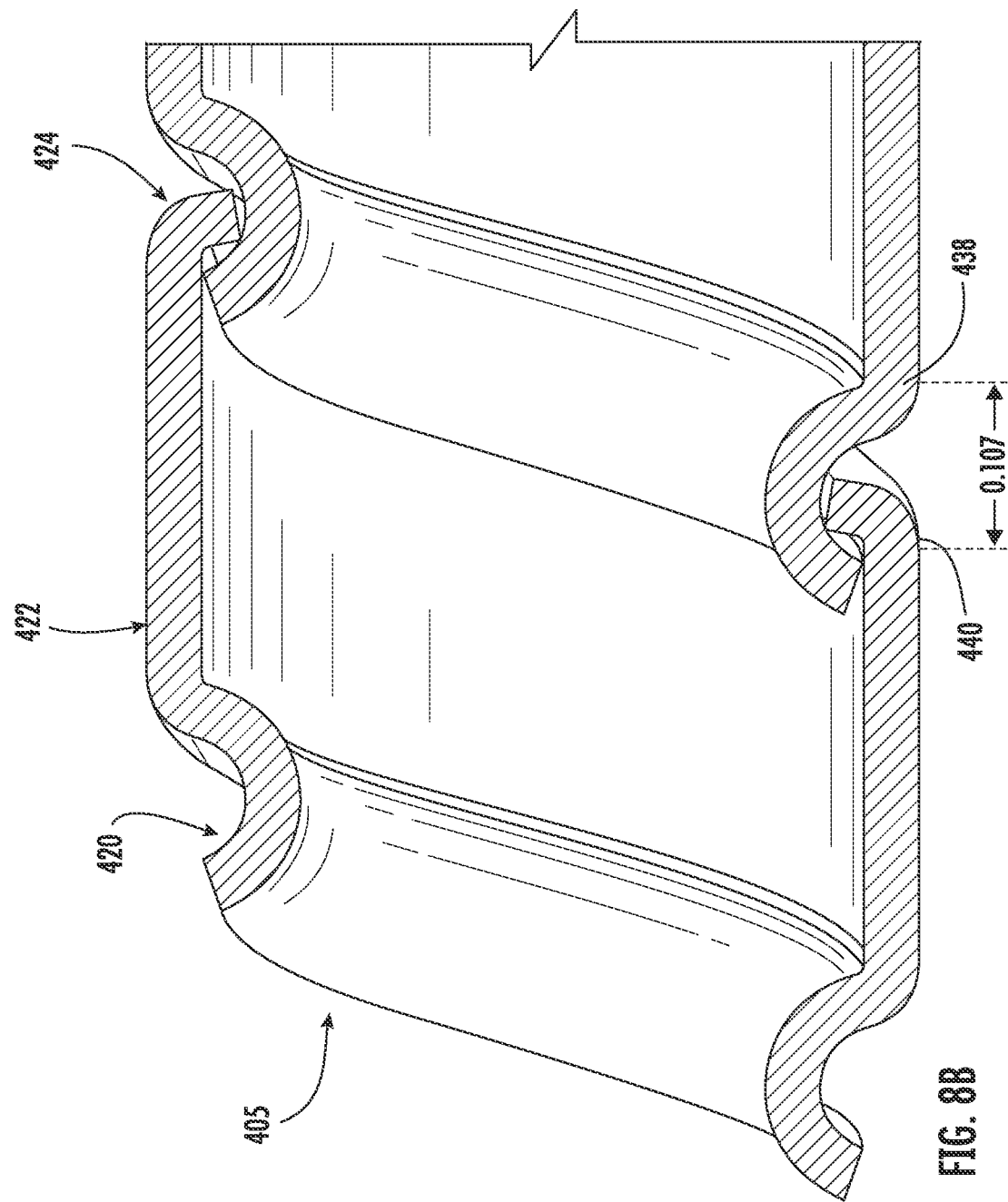

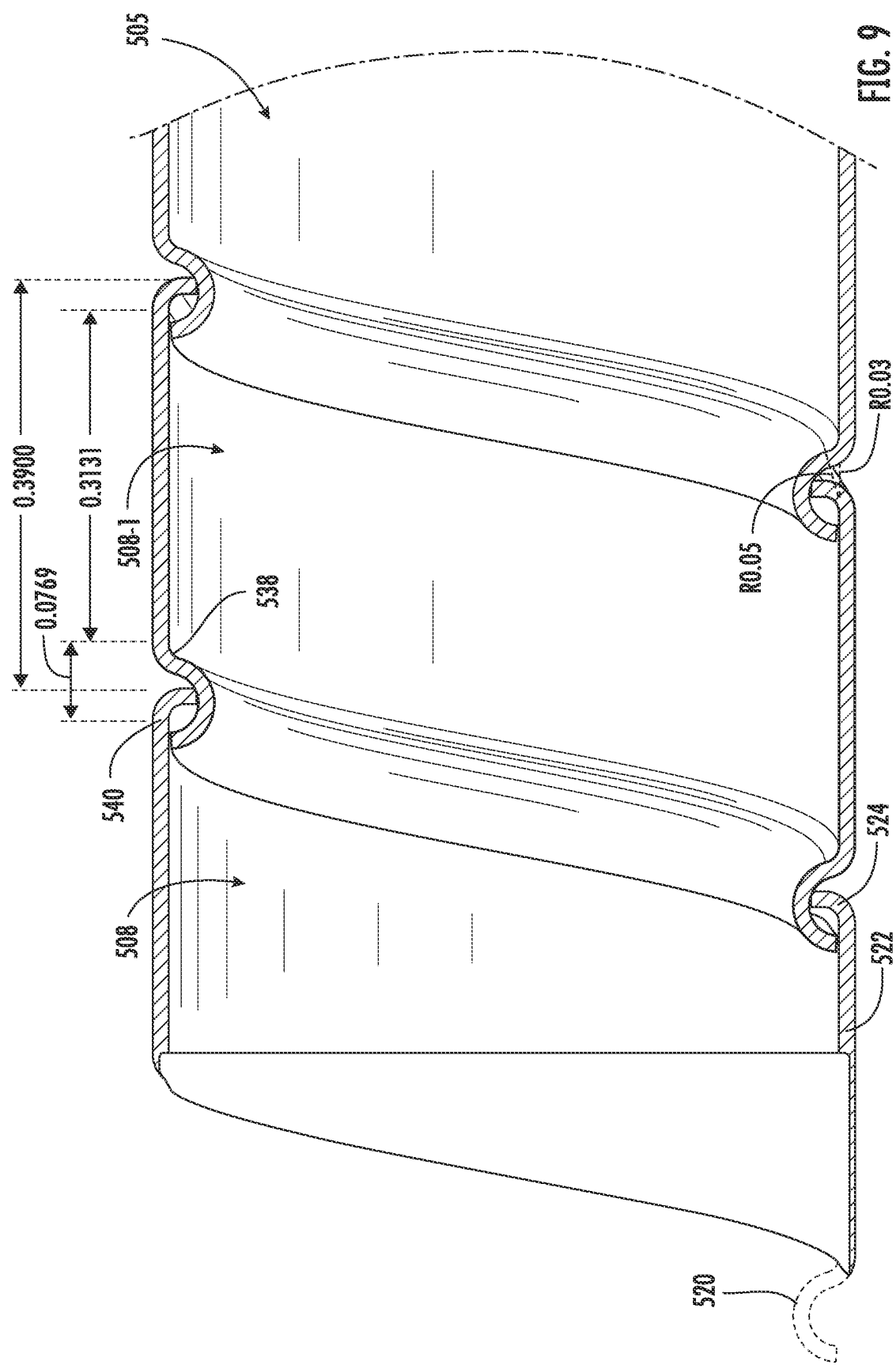

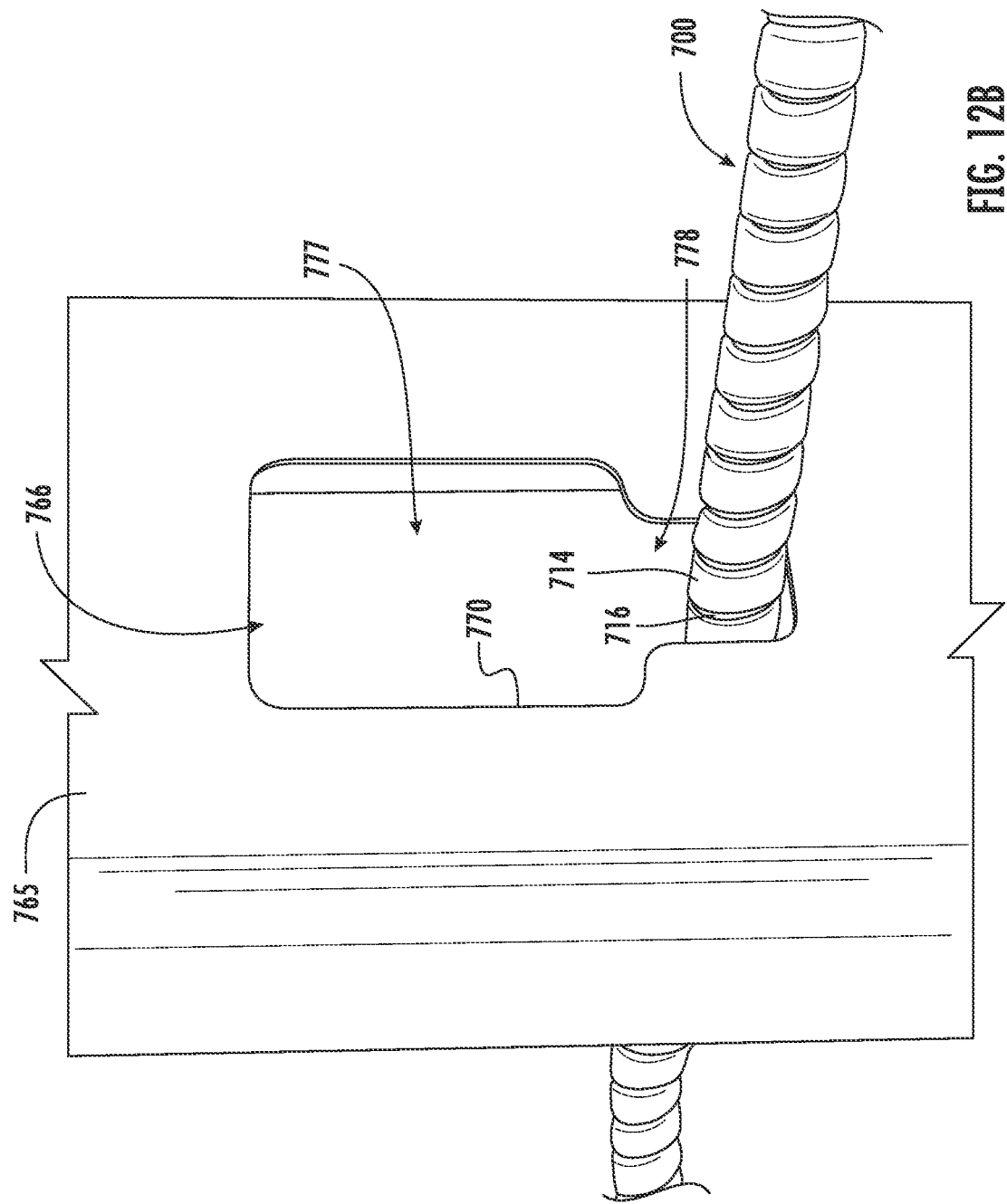

LOW-PROFILE CABLE ARMOR

CROSS-REFERENCE TO RELATED APPLICATION

This is a continuation application of co-pending non-provisional patent application Ser. No. 17/493,173, filed on Oct. 4, 2021 and titled "LOW-PROFILE CABLE ARMOR," now issued as U.S. Pat. No. 11,587,699, which is a continuation-in-part application of non-provisional application Ser. No. 17/408,629, filed on Aug. 23, 2021 and titled "LOW-PROFILE CABLE ARMOR", now issued as which is a continuation application of non-provisional application Ser. No. 16/578,842, filed on Sep. 23, 2019 and titled "LOW-PROFILE CABLE ARMOR", now issued as U.S. Pat. No. 11,101,056, the entirety of which applications are incorporated by reference herein.

BACKGROUND OF THE DISCLOSURE

Field of the Disclosure

The present disclosure relates generally to armored cables. More particularly, the present disclosure relates to a low-profile armored cable assembly.

Discussion of Related Art

Armored cable ("AC") and Metal-Clad ("MC") cable provide electrical wiring in various types of construction applications. The type, use, and composition of these cables should satisfy certain standards as set forth, for example, in the National Electric Code® (NEC®). (National Electrical Code and NEC are registered trademarks of National Fire Protection Association, Inc.) These cables house electrical conductors within a metal armor. The metal armor may be flexible to enable the cable to bend, while still protecting the conductors against external damage during and after installation. The metal armor which houses the electrical conductors may be made from steel or aluminum, copper-alloys, bronze-alloys and/or aluminum alloys. Typically, the metal armor is formed from strip steel, for example, which is helically wrapped to form a series of interlocked sections along a longitudinal length of the cable. Alternatively, the metal armor may be made from smooth or corrugated metal.

While installing MC cable, the product may be passed through wooden or metal studs. Prior art metal armor profiles often have more pronounced peaks, with deeper and wider valleys between adjacent peaks. This construction often causes the cable to grab and get hung up on edges of the studs, requiring readjustment of the cable while installing, which leads to installer fatigue, slower installation, and potential damage to the studs.

A need therefore exists for an armored cable that addresses at least some of the above issues.

SUMMARY OF THE DISCLOSURE

Exemplary approaches provided herein are directed to an armored cable assembly. In one approach, a cable assembly may include at least one conductor and a metal sheath disposed over the at least one conductor, the metal sheath including a continuous strip of metal having a plurality of revolutions. At least a first revolution of the plurality of revolutions may include a first section having a curved profile extending into an interior cavity of the metal sheath, and a second section extending from the first section, the second section extending along a lengthwise axis, wherein a length of the second section, along the lengthwise axis, is at least two times as large as a diameter of the first section when the metal sheath is in a linear configuration. The first revolution of the plurality of revolutions may further include a third section extending from the second section, the third section including a free end terminating within a recess defined by a curved profile of a first section of an adjacent revolution of the plurality of revolutions.

In another approach, a metal-clad (MC) cable assembly may include a plurality of conductors cabled together, and a metal sheath comprising a single metal strip wound around the plurality of conductors in a series of helical revolutions extending along a lengthwise axis. A first helical revolution of the series of helical revolutions may include a first section having a profile extending into an interior cavity of the metal sheath, a second section extending from the first section, the second section extends into an interior cavity defined by the series of helical revolutions, and a third section extending from the second section. The third section may include a free end terminating within a recess defined by a curved profile of a first section of an adjacent helical revolution of the series of helical revolutions, wherein the first section and the second section of the first helical revolution connect at a first inflection point, wherein the second section and the third section of the first helical revolution connect at a second inflection point, and wherein a length of the second section of the first helical revolution is at least three times as large as a distance between the second inflection point of the first helical revolution and a first inflection point of the adjacent helical revolution of the series of helical revolutions when the metal sheath is in a linear configuration.

In yet another approach, a metal-clad (MC) cable assembly may include a plurality of conductors extending along a lengthwise axis and a metal sheath comprising a single, continuous metal strip wound helically around the plurality of conductors in a series of convolutions, the series of convolutions comprising a first convolution in direct abutment with a second convolution. The first convolution may include a first convolution first section having a first curved profile, wherein the first semicircular profile extends into an interior cavity of the metal sheath, and a first convolution second section extending from the first convolution first section at a first convolution first inflection point, the first convolution second section extending along to the lengthwise axis. The first convolution may further include a first convolution third section extending from the first convolution second section at a first convolution second inflection point. The second convolution may further include a second convolution first section having a second curved profile, wherein the second semicircular profile extends into the interior cavity of the metal sheath, a second convolution second section extending from the second convolution first section at a second convolution first inflection point, the second convolution second section extending along the lengthwise axis, and a second convolution third section extending from the second convolution second section at a second convolution second inflection point. The first convolution third section may terminate within a recess defined the second convolution first section, wherein a length of the first convolution second section, along the lengthwise axis, is at least two times as large as a diameter of the first convolution first section when the metal sheath is in a linear configuration.

In yet another approach, a method of forming a metal-clad (MC) cable assembly may include cabling a plurality of conductors together, and helically wrapping a single continuous strip of metal around a plurality of conductors to create a metal sheath, the metal sheath comprising a series of helical revolutions extending along a lengthwise axis. At least two helical revolutions of the series of helical revolutions may each include a first section having a curved profile, wherein the curved profile is concave relative to the lengthwise axis, a second section extending from the first section, the second section extending parallel to the lengthwise axis, and a third section extending from the second section. The third section may include a free end terminating within a recess defined by a first section of an adjacent helical revolution of the series of helical revolutions, wherein the first section and the second section connect at a first inflection point, wherein the second section and the third section connect at a second inflection point, and wherein a length of the second section is at least three times as large as a distance between the second inflection point and the first inflection point of the adjacent helical revolution of the series of helical revolutions when the metal sheath is in a linear configuration.

BRIEF DESCRIPTION OF THE DRAWINGS

The accompanying drawings illustrate exemplary approaches of the disclosed armored cable assembly so far devised for the practical application of the principles thereof, and in which:

FIG. 1 is a side view of an armored cable assembly according to embodiments of the present disclosure;

FIG. 2 is a cross-sectional view of the armored cable assembly of FIG. 1 according to embodiments of the present disclosure;

FIGS. 8A-8B are side cross-sectional views of an example revolution and metal sheath according to embodiments of the present disclosure;

FIG. 9 is a side cross-sectional view of an example metal sheath according to embodiments of the present disclosure;

FIGS. 12A-12B demonstrates an MC cable assembly during installation according to embodiments of the present disclosure.

Figure 3:
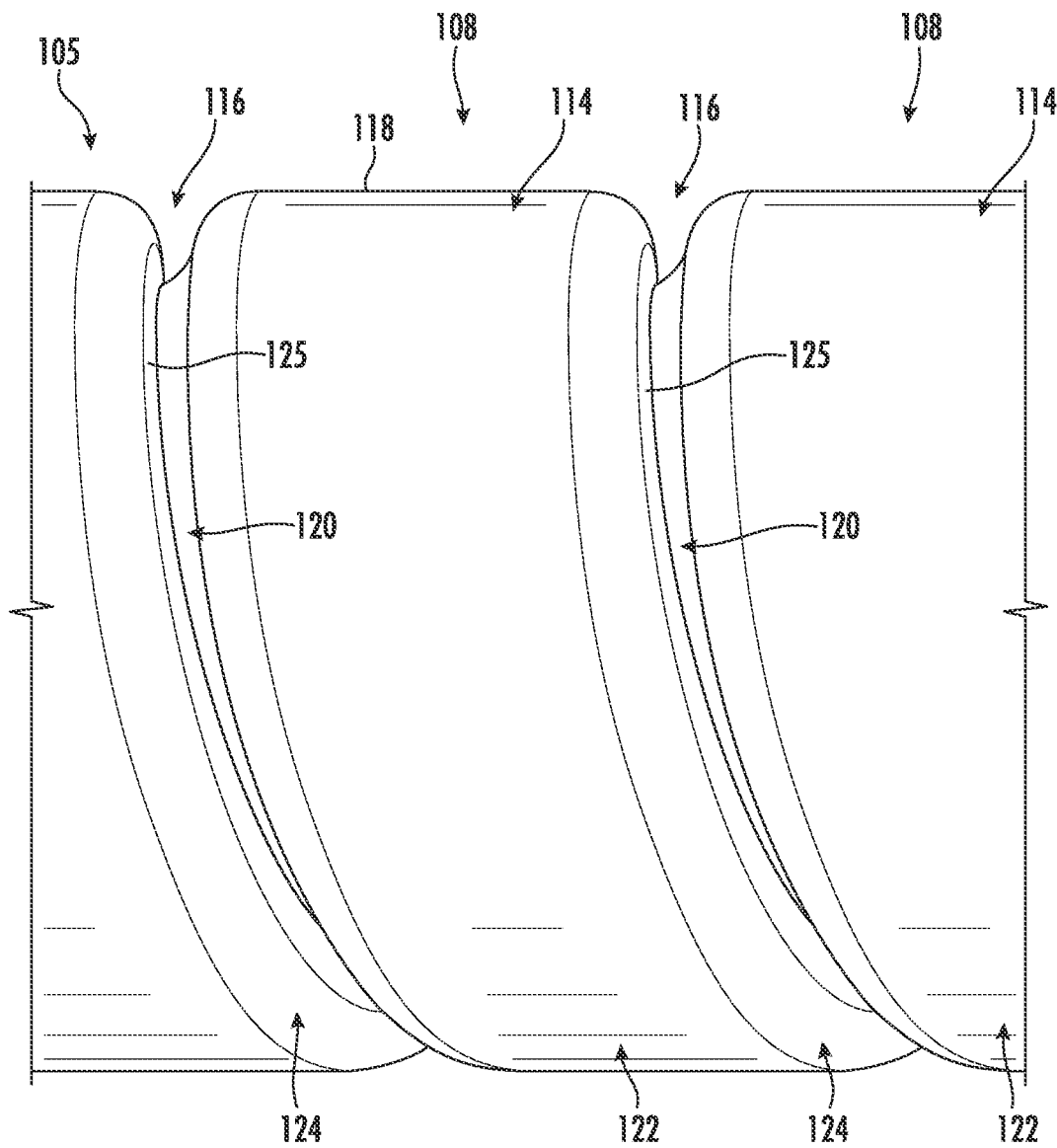
FIG. 3 is a side view of the armored cable assembly of FIG. 1 according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed armored cable assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the above identified drawbacks of the prior art, embodiments of the present disclosure provide a novel exterior armor profile that is relatively flat and creates smaller valleys between adjacent convolutions. The flat profile allows cables installers to more easily pull the cable through, studs, cable trays, supports, etc., and with less hang ups and friction. Furthermore, the cable of the present disclosure doesn't nest into other cables or itself. As a result, less entanglements occur, for example, when pulling two or more cables along one another. The flat profile further allows for easier unidirectional pulling installation. Still furthermore, cables having the armor profile of the present disclosure have a smaller diameter and bend radius for packaging and installation, while still meeting performance requirements for MC cables (e.g., minimum crush-resistance and flexibility).

Referring now to the side view of FIG. 1 and to the side cross-sectional view of FIG. 2, an exemplary cable assembly 100 according to embodiments of the present disclosure will be described in greater detail. As shown, the armored cable assembly (hereinafter "assembly") 100 may include a plurality of conductors 102 extending either parallel to one another or cabled together, e.g., in either a right or left hand lay. The conductors 102 generally extend along a lengthwise axis 'LA' of the assembly 100 and may be enclosed by a metal sheath 105. Although non-limiting, the assembly 100 may be a Metal-Clad (MC) cable assembly. In some embodiments, only a single conductor is present within the metal sheath 105. Although non-limiting, the conductors 102 may include one or more copper wires covered with a thermoplastic insulation (e.g., THHN/THWN with a 90° C. rating).

The metal sheath 105 may be formed as a seamless or welded continuous sheath having a generally circular cross section with a thickness of about 0.005 to about 0.060 inches. The metal sheath 105 may be formed from a flat or shaped metal strip, the edges of which are helically wrapped and interlock to form a series of revolutions 108A-108N along the length of the conductors 102. In this manner, the metal sheath 105 allows the resulting assembly 100 to have a desired bend radius sufficient for installation within a building or structure. The metal sheath 105 may also be formed into shapes other than circles such as, but not limited to, rectangles, polygons, ovals and the like. The metal sheath 105 provides a protective metal covering around the conductors 102.

The metal sheath 105 may be formed by using an armoring machine to helically wind one or more metal strips around the conductors 102. The edges of the metal strip interlock to form a series of peaks 114 and valleys 116 along the length of the metal sheath 105, as will be described in greater detail below.

As shown, a binder 110 may be wrapped around the conductors 102. It should be understood that a greater or fewer number of conductors can be utilized and the assembly 100 can be utilized without a binder, depending on the particular application in which the assembly 100 is being used. Furthermore, although not shown, it will be appreciated that assembly 100 may include one or more filler members within the metal sheath 105. In one approach, a longitudinally oriented filler member is disposed within the metal sheath 105 adjacent to the plurality of conductors 102 to push the plurality of conductors 102 radially outward and into contact with an inside surface of metal sheath 105. The filler member can be made from any of a variety of fiber or polymer materials. Furthermore, the filler member can be used with MC cable assemblies having any number of insulated conductor assemblies.

Figure 4A:
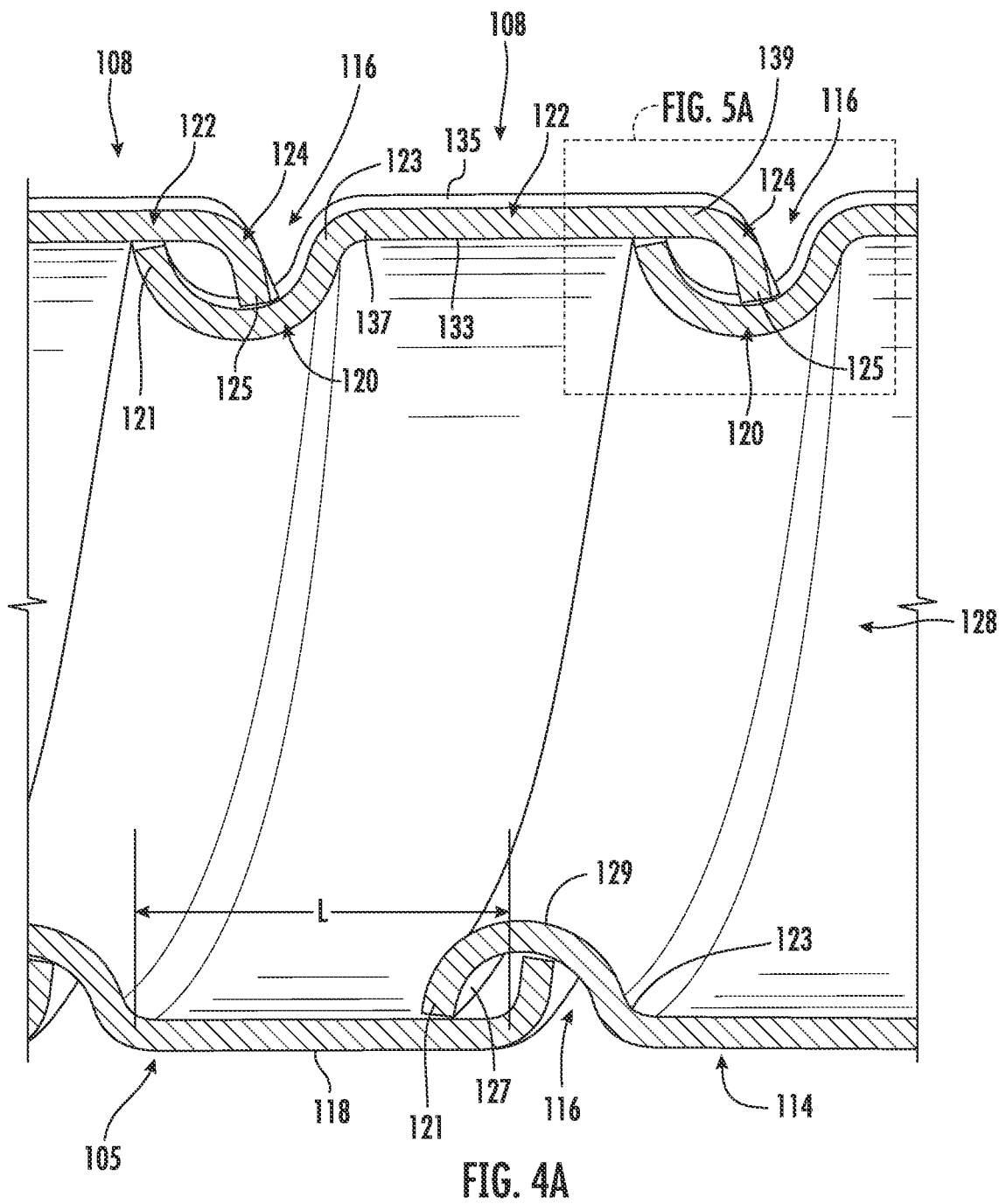
FIG. 4A is a cross-sectional view of the armored cable assembly of FIG. 3 according to embodiments of the present disclosure.
Figure 4B:
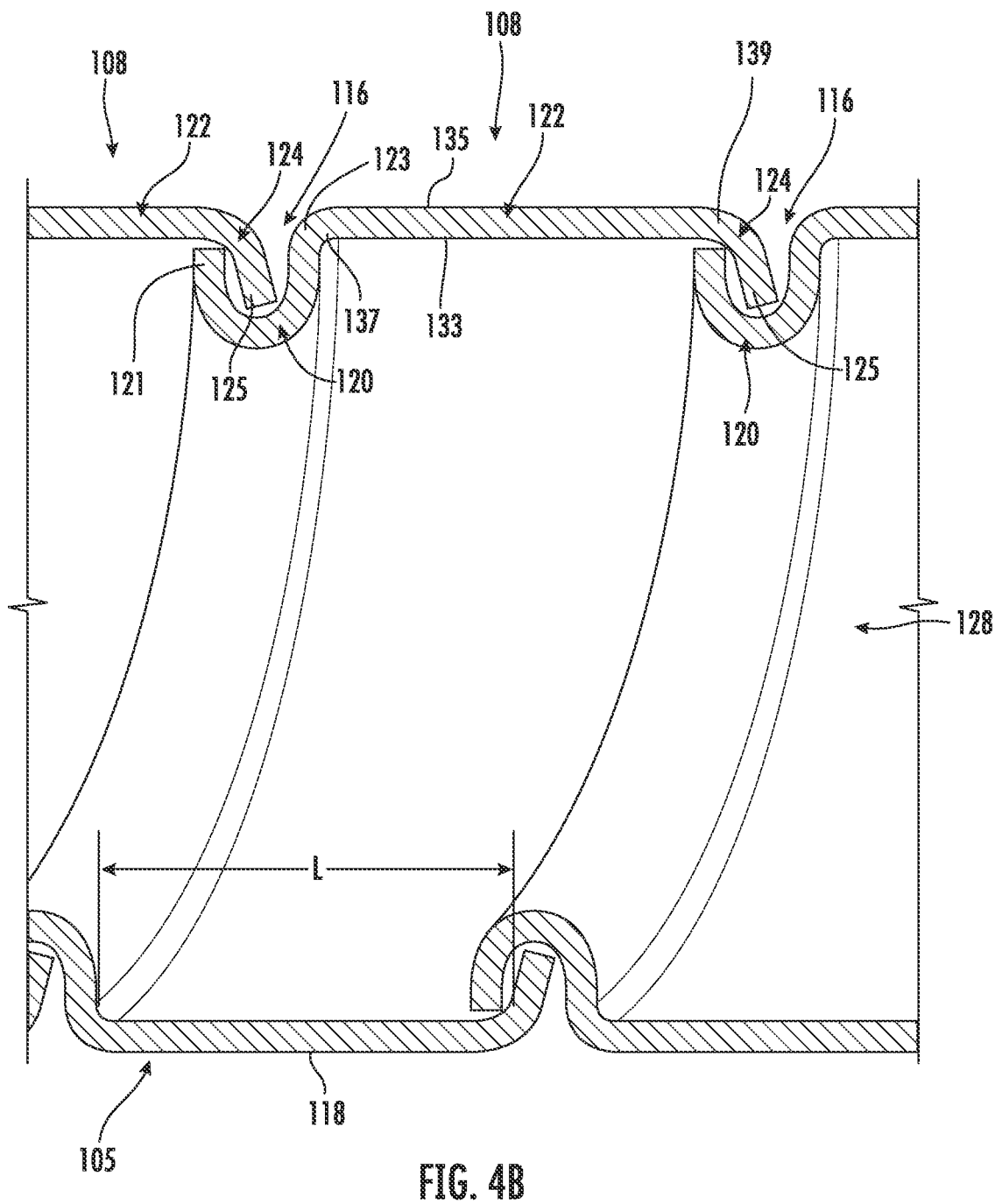
FIG. 4B is a cross-sectional view of an armored cable assembly according to embodiments of the present disclosure.
Figure 4C:
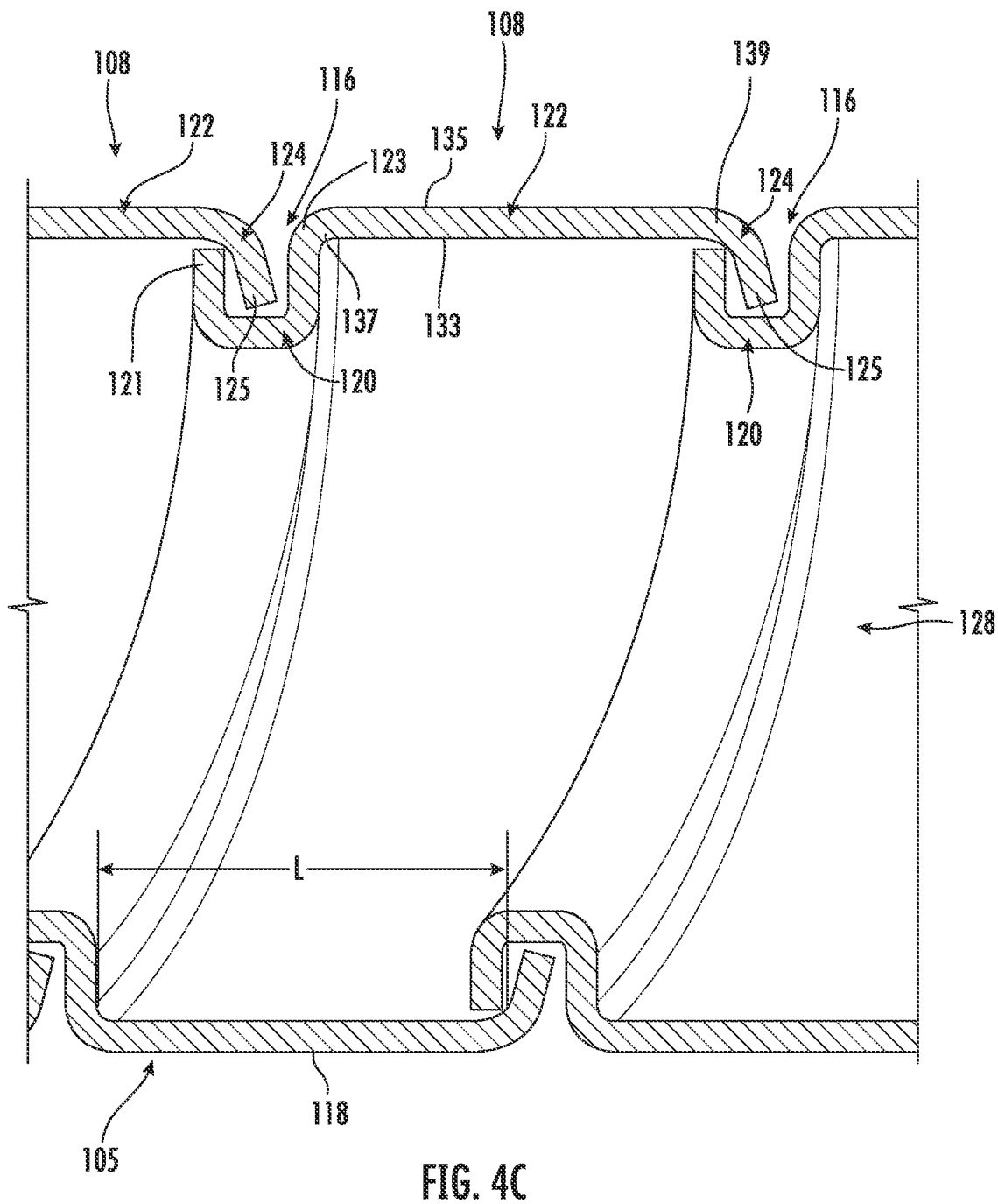
FIG. 4C is a cross-sectional view of an armored cable assembly according to embodiments of the present disclosure.
Figure 4D:
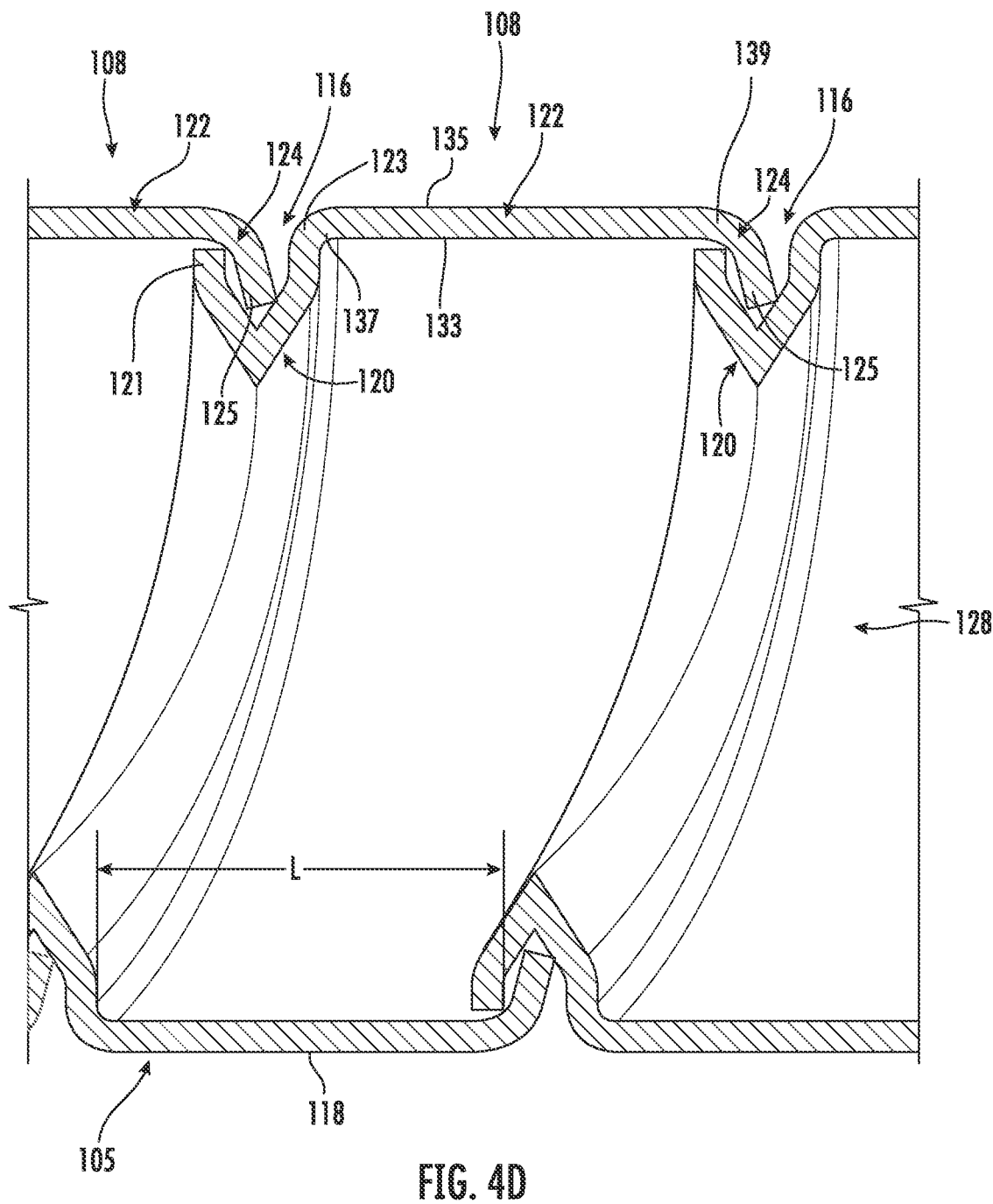
FIG. 4D is a cross-sectional view of an armored cable assembly according to embodiments of the present disclosure.
Figure 4E:
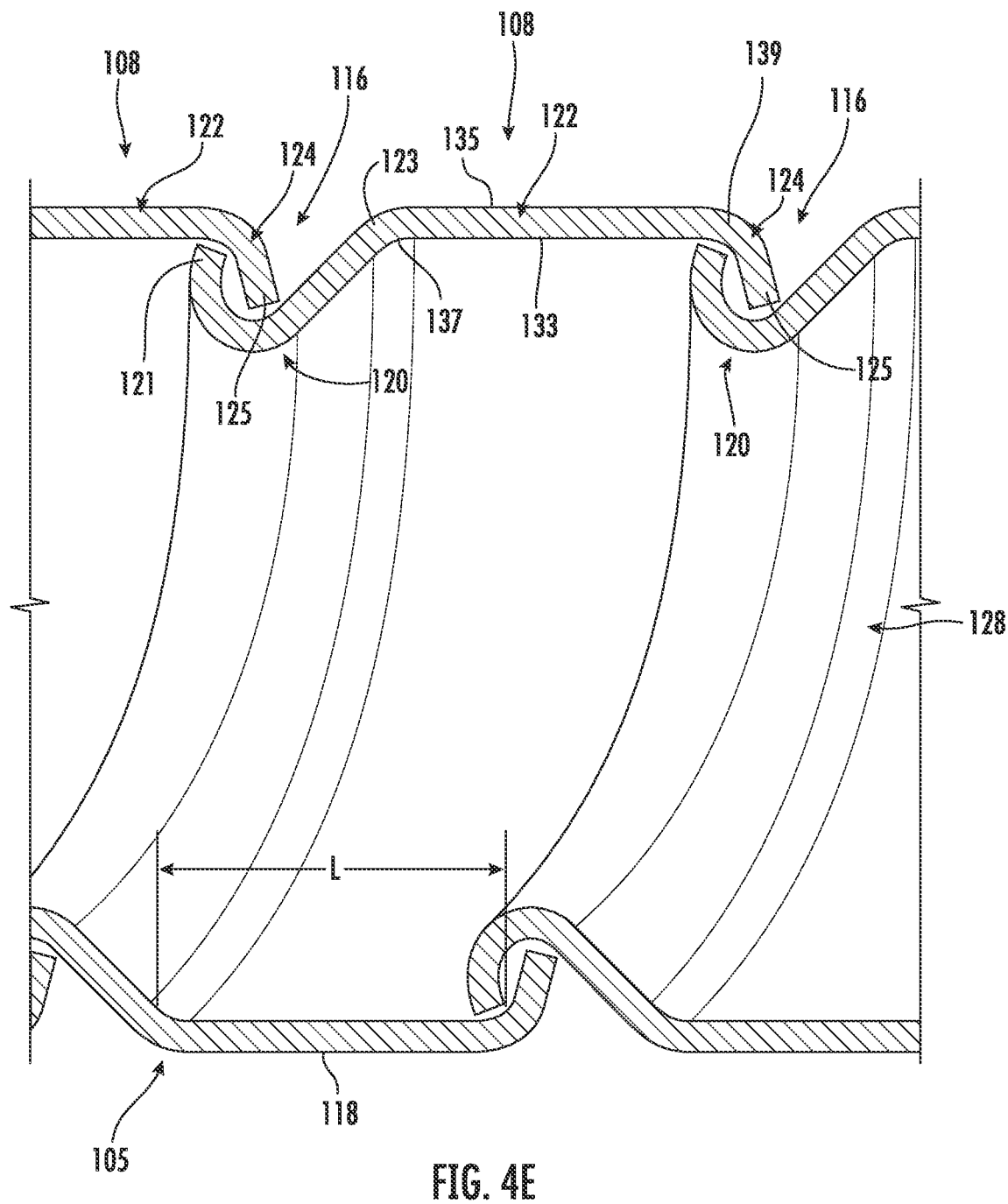
FIG. 4E is a cross-sectional view of an armored cable assembly according to embodiments of the present disclosure.

Turning now to FIGS. 3-4A, the metal sheath 105 according to embodiments of the present disclosure will be described in greater detail. As shown, the metal sheath 105 may be formed of a continuous metal strip, such as aluminum, having revolutions 108 that overlap or interlock, with uniformly spaced peaks 114 and valleys 116 defining an outer surface 118 of the sheath 105. The revolutions 108 extend helically around the lengthwise axis 'LA' (FIGS. 1-2). In some embodiments, each of the revolutions 108 may include a first section 120 having a curved, radiused, bowed, arched, or semicircular profile extending into an interior cavity 128 of the metal sheath 105. In other embodiments, the first section 120 may have an alternative profile such as, but not limited to, oval (FIG. 4B), rounded u-shaped (FIG. 4C), v-shaped (FIG. 4D), j-shaped (FIG. 4E), and others. In various embodiments, a radius of the first section 120 may be constant or varied. In various embodiments, the first section 120 may include one or more flat sections/surfaces and one or more curved sections/surfaces. Adding one or more flattened sections may increase movement and create a more flexible sheath 105. Furthermore, in various embodiments, the first section 120 may have a constant or varied thickness between a first end 121 and a second end 123, wherein the thickness is measured between a first surface 127 and a second surface 129. As best shown in FIG. 4A, the first surface 127 generally faces away from the interior cavity 128 while the second surface 129 generally faces the interior cavity 128.

As further shown, each revolution 108 may include a second section 122 integrally formed with, and extending from, the first section 120. In some embodiments, the second section 122 has a generally planar or flat outer profile extending along the lengthwise axis. That is, a plane defined by an inner surface 133 and/or an outer surface 135 of the second section 122 may be parallel with the lengthwise axis when the metal sheath 105 is in a straight or linear configuration. Furthermore, in various embodiments, the second section 122 may have a constant or varied thickness between a first end 137 and a second end 139, wherein the thickness is measured between the inner surface 133 and/or the outer surface 135. Still furthermore, second sections 122 on circumferentially opposite sides of the metal sheath 105 (e.g., top and bottom) generally extend parallel to one another when the metal sheath 105 is in a straight or linear configuration. In some embodiments, a thickness of the first section 120 is the same as a thickness of the second section 122.

Figure 4F:
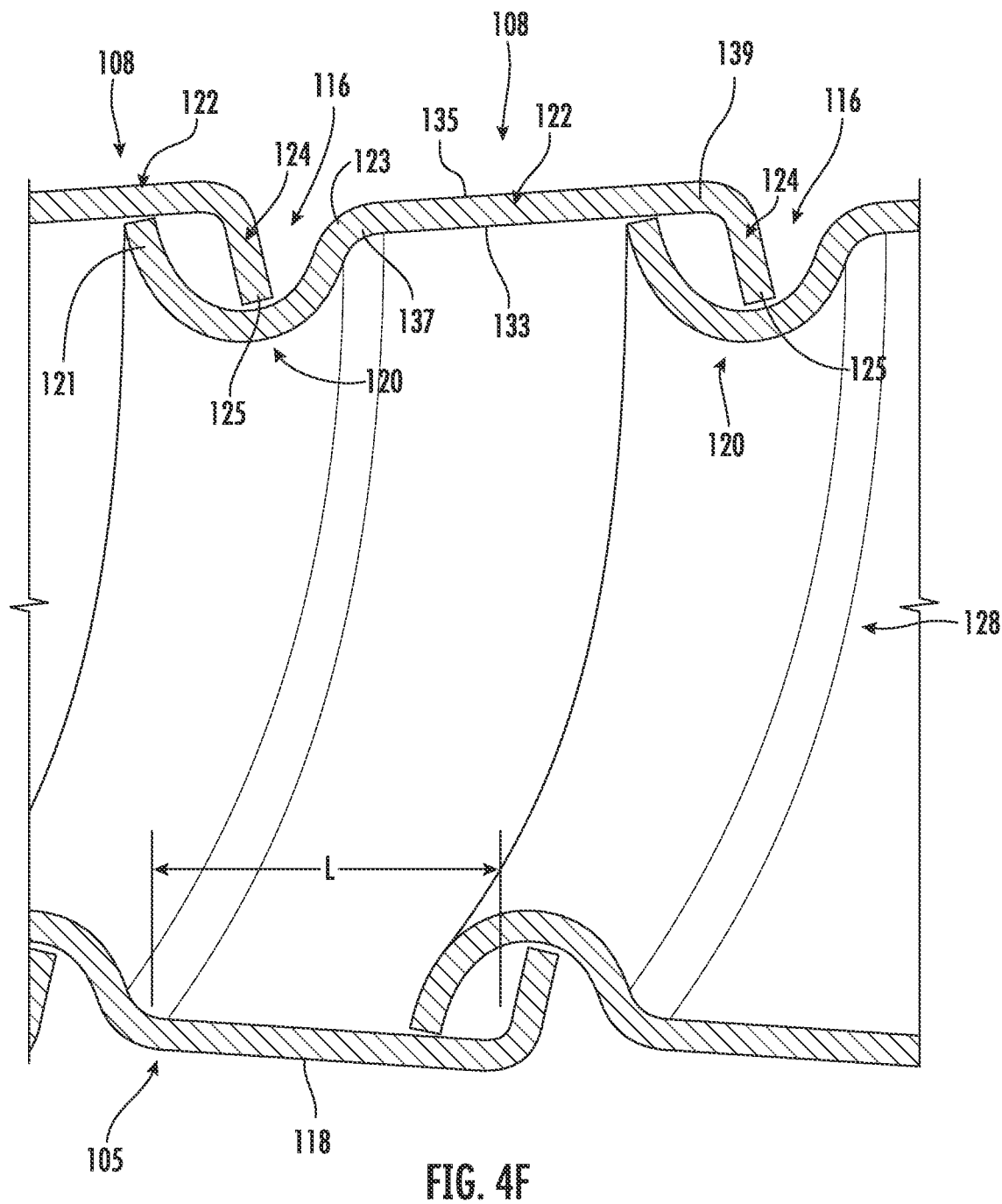
FIG. 4F is a cross-sectional view of an armored cable assembly according to embodiments of the present disclosure.

In other embodiments, as shown in FIG. 4F, a plane defined by the inner surface 133 and/or the outer surface 135 of the second section 122 may be non-parallel with the lengthwise axis when the metal sheath 105 is in a straight or linear configuration. For example, the second section 122 may extend at an angle between 0.1°-15° relative to the lengthwise axis. In some embodiments, each of the second sections 122 may extend along a same plane when the metal sheath 105 is in a straight or linear configuration. In other embodiments, one or more of the second sections 122 may generally extend along a different plane from another of the second sections 122 when the metal sheath 105 is in a straight or linear configuration.

Figure 4G:
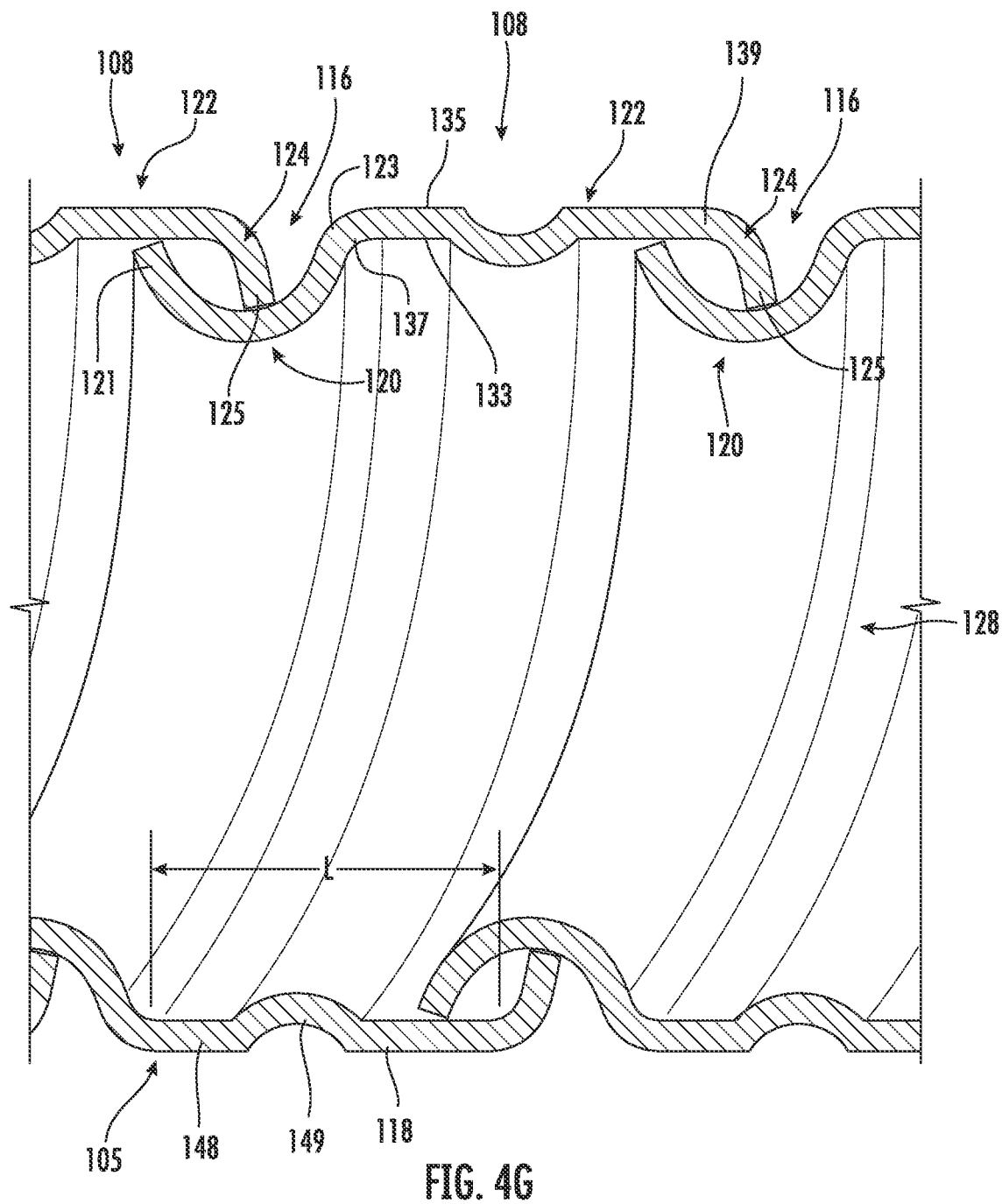
FIG. 4G is a cross-sectional view of an armored cable assembly according to embodiments of the present disclosure.
Figure 4H:
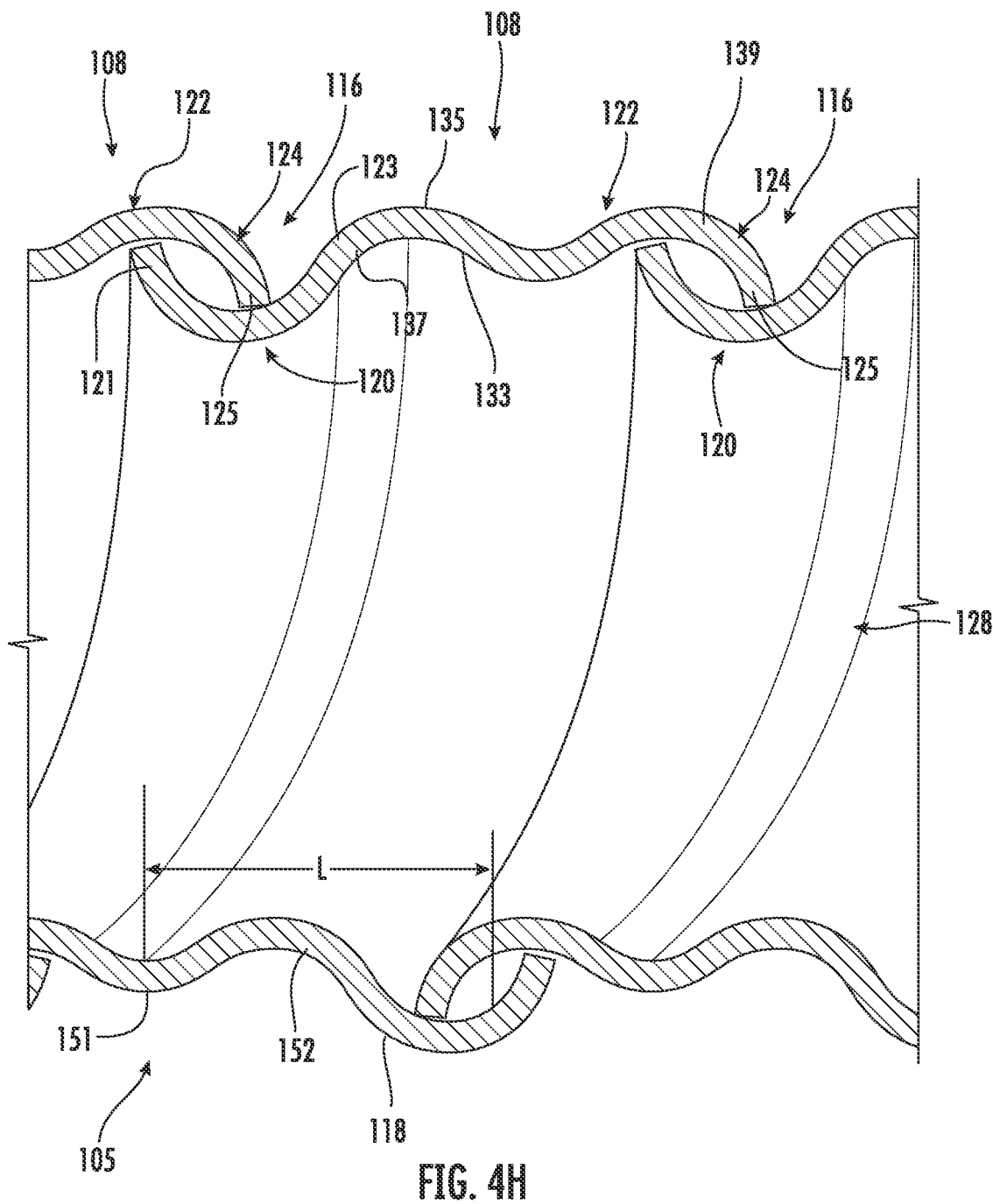
FIG. 4H is a cross-sectional view of an armored cable assembly according to embodiments of the present disclosure.

As shown in FIG. 4G, in some embodiments, the second section 122 may include one or more flat sections/surfaces 148 and one or more curved sections/surfaces 149. As shown in FIG. 4H, in some embodiments, the second section 122 may have an undulating or curvilinear profile including, e.g., one or more peaks 151 and one or more valleys 152.

Each of the revolutions 108 may further include a third section 124 integrally formed with, and extending from, the second section 122. As shown, the third section 124 may include a free end 125 angled towards the interior cavity 128 of the metal sheath 105. The third section 124 mechanically interlocks with the first section 120. In some embodiments, the third section 124 may include one or more flat sections/surfaces and one or more curved sections/surfaces. In various embodiments, the third section 124 may have a constant or varied thickness along its length. In some embodiments, a thickness of the third section 124 is the same as a thickness of the second section 122 and the first section 120.

Figure 5A:
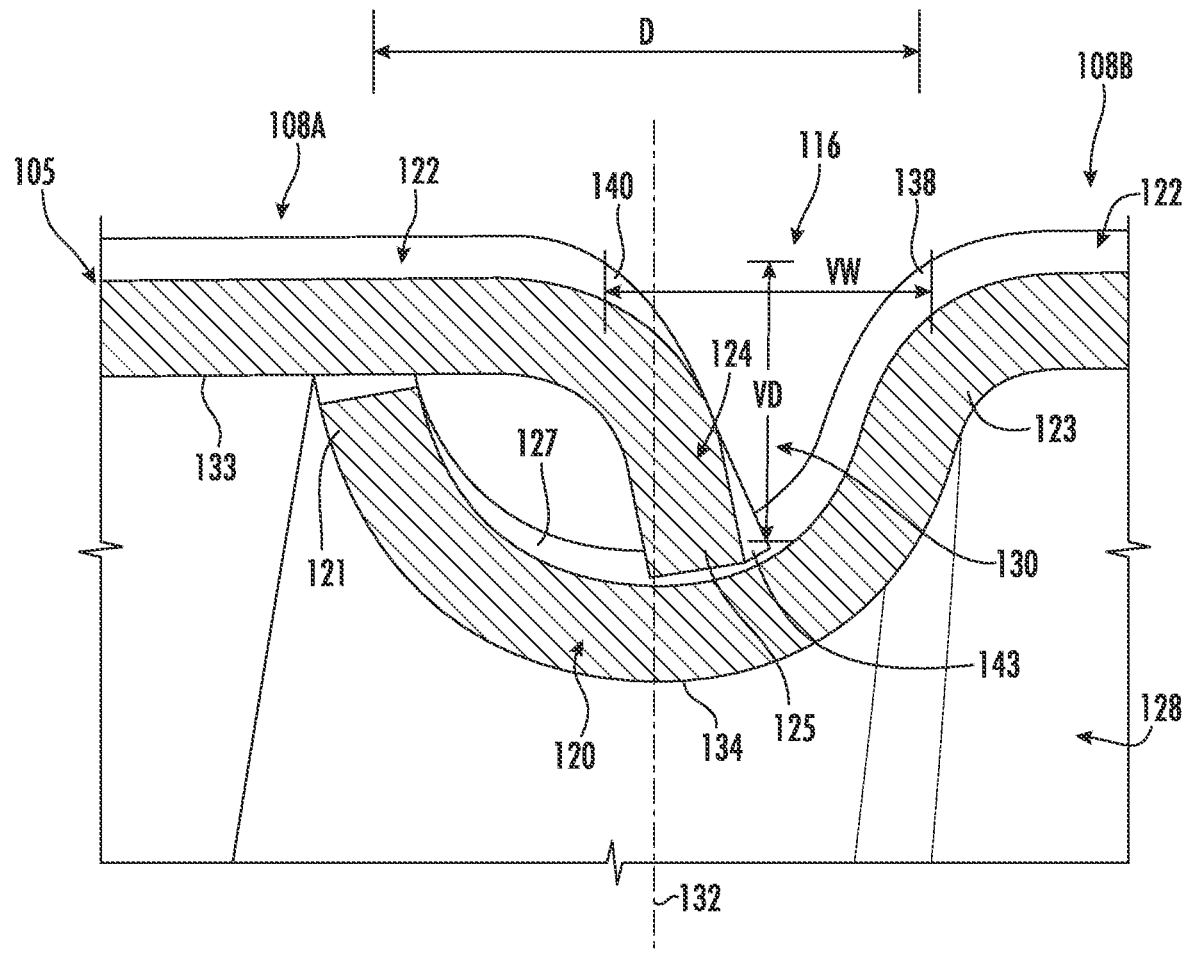
FIG. 5A is a close-up cross-sectional view of a portion of the armored cable assembly of FIG. 4 according to embodiments of the present disclosure.
Figure 5B:
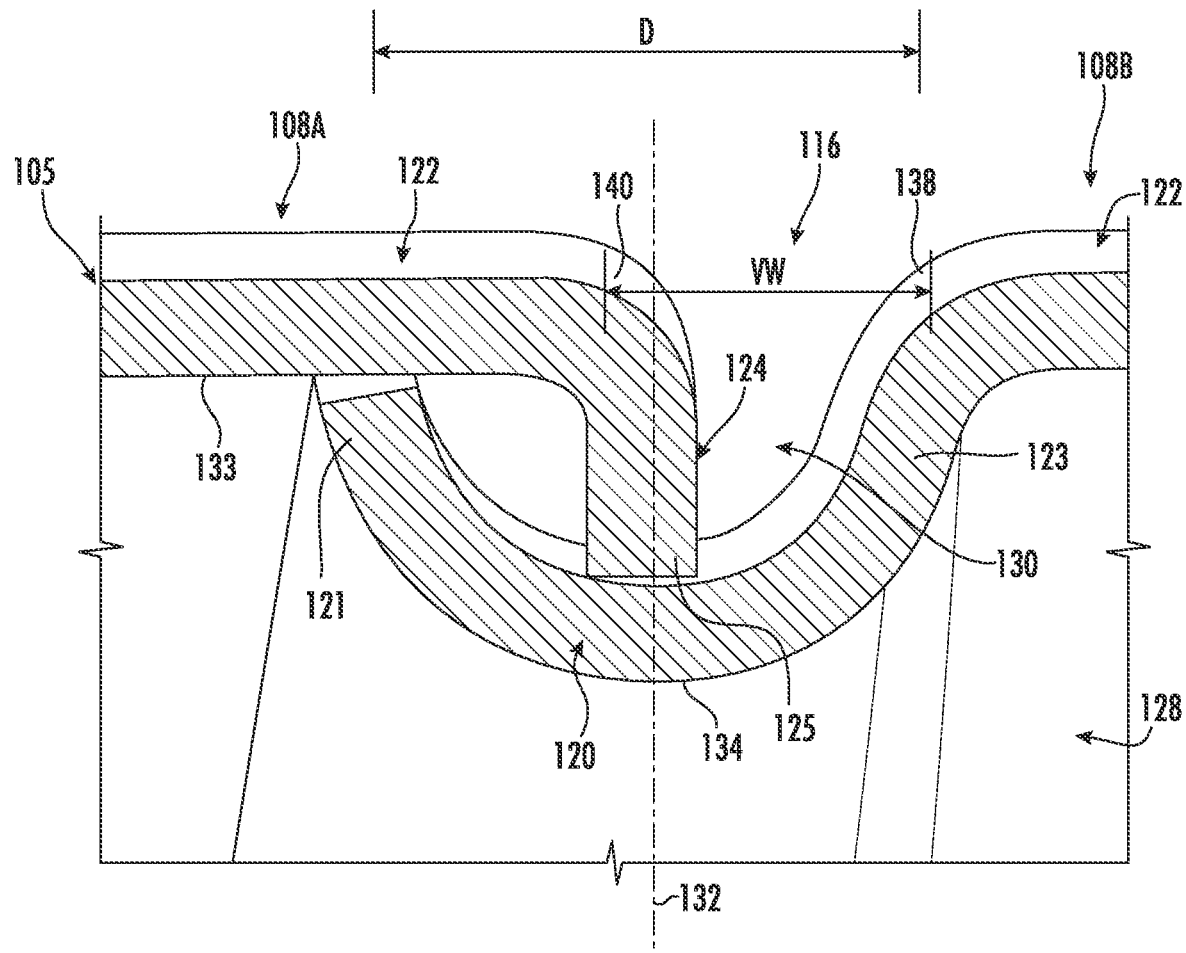
FIG. 5B is a close-up cross-sectional view of a portion of an armored cable according to embodiments of the present disclosure.
Figure 5C:
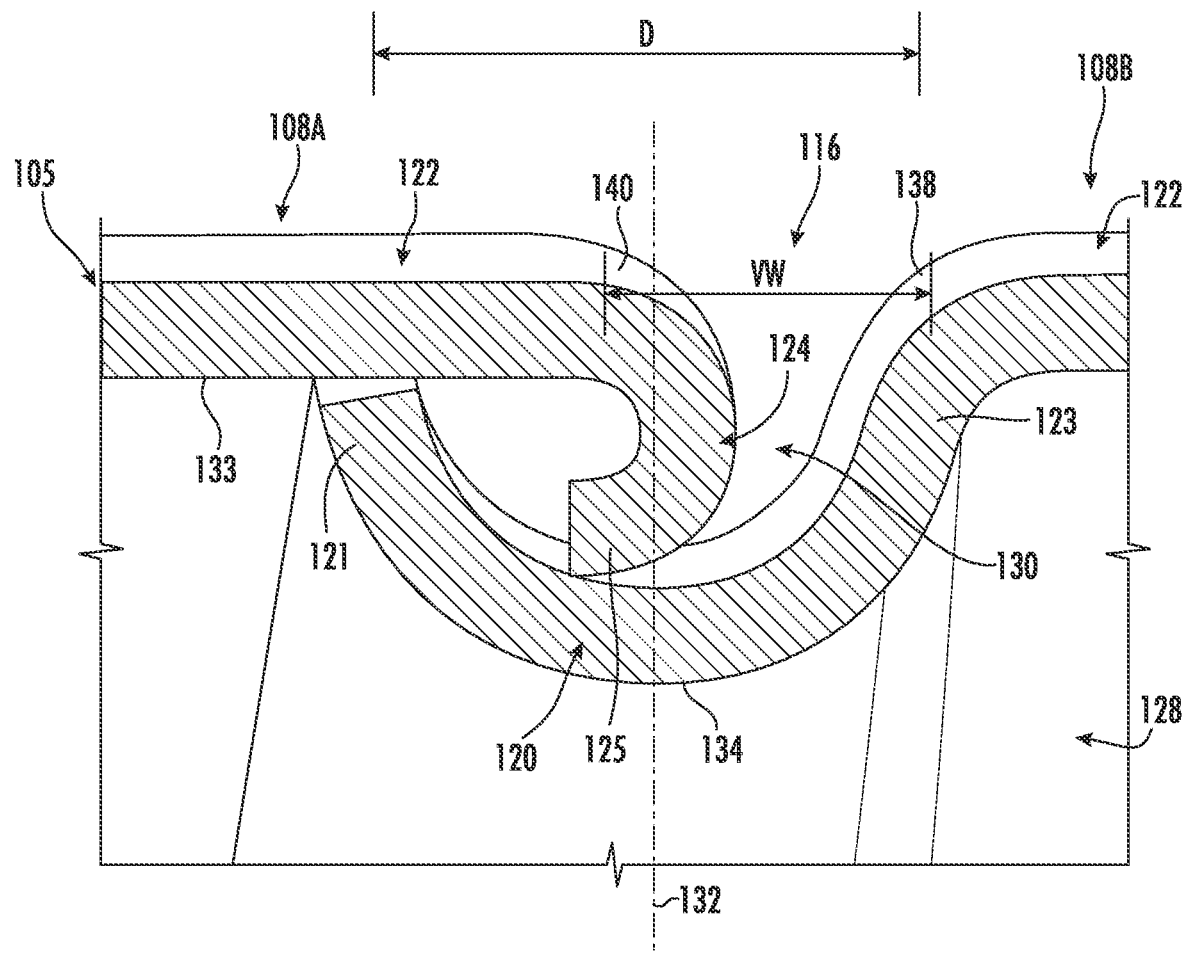
FIG. 5C is a close-up cross-sectional view of a portion of an armored cable according to embodiments of the present disclosure.

Turning now to FIGS. 5A-5C, portions of the metal sheath 105 according to embodiments of the present disclosure will be described in greater detail. As shown, the free end 125 of the third section 124 of revolution 108A may extend into and terminate within a recess 130 defined by the profile of the first section 120 of adjacent revolution 108B. As shown in FIG. 5A, the free end 125 of the third section 124 may extend towards the interior cavity 128 at a non-zero angle (e.g., between 1-25°) with respect to a plane 132 extending through the first section 120. Orienting the free end 125 at a non-zero angle may provide increased flexibility for revolution 108A and the adjacent revolution 108B. In other embodiments, as shown in FIG. 5B, the free end 125 may extend towards the interior cavity 128 parallel to the plane 132. Orienting the free end 125 parallel to the plane 132 may provide better crush resistance for the sheath 105. In yet other embodiments, as shown in FIG. 5C, the free end 125 of the third section 124 may extend towards the interior cavity 128 at a second non-zero angle. That is, to improve crush resistance of the sheath 105, the free end 125 of the third section 124 may be positioned closer to the first end 121 of the first section 120 than to the second end 123 of the first section 120. As shown, the plane 132 may extend perpendicular to the inner surface 133 of the second section 122 and through a trough or bottom most point 134 of the first section 120.

The valley 116 can be defined by a valley width 'VW', which may be measured from a first inflection point 138 located at an intersection of the first section 120 and the second section 122 of revolution 108B, and a second inflection point 140 located at an intersection of the second section 122 and the third section 124 of revolution 108A. More specifically, in order to prevent excessive hang ups during installation of the assembly 100, which may cause installer fatigue and/or damage to studs of a structure being wired, it is advantageous to make VW as small as possible relative to the other portions of the metal sheath 105. For example, a length 'L' (FIG. 4A) of the second section 122, along the lengthwise axis, may be at least three times as large/long as VW, and at least two times as large as a diameter TY of the first section 120. In the embodiment shown, the diameter may be measured from a midpoint of the first end 121 of the first section 120, between the first surface 127 and the second surface 129, and a midpoint of the second end 123 of the first section 120, between the first surface 127 and the second surface 129. In other embodiments, diameter may refer to an outer diameter or an inner diameter of the first section 120.

In some embodiments, the length of the second section 122 may be between two times and four times as large/long as VW. In some embodiments, the length of the second section 122 may be between 1.5 times and ten times as large/long as VW. In some embodiments, the length of the second section 122 may be between two times and five times as large/long as the diameter of the first section 120. In some embodiments, the length of the second section 122 may be between 1.5 times and ten times as large as the diameter of the first section 120. Embodiments herein are not limited in this context.

Furthermore, VW may be less than the diameter of the first section 120. More specifically, the diameter of the first section 120 may be between 1.1 times and three times as large/long as VW. In other embodiments, the diameter of the first section 120 may be between 1.1 times and ten times as large/long as VW. To further minimize VW, the free end 125 of the third section 124 may extend past the plane 132 to provide a more compact construction with a smaller valley depth 'VD' measured at a point where an end surface 143 of the third section 124 of revolution 108A engages the first surface 127 of the first section 120 of revolution 108B. For example, when the free end 125 of the third section 124 extends at an angle between 5-15° relative to the plane 132, the free end 125 of the third section 124 of revolution 108A may be closer to the second end 123 of the first section 120 of revolution 108B than to the first end 121 of the first section 120 of revolution 108B. As the angle of the free end 125 of the third section 124 increases relative to the plane 132, the valley depth decreases, which minimizes bothersome chatter and decreases a force required to pull the metal sheath 105 through structures (e.g., studs) during installation of the assembly 100. Instead, the revolutions 108A-108N will glide more easily across or through the structures.

Figure 6:
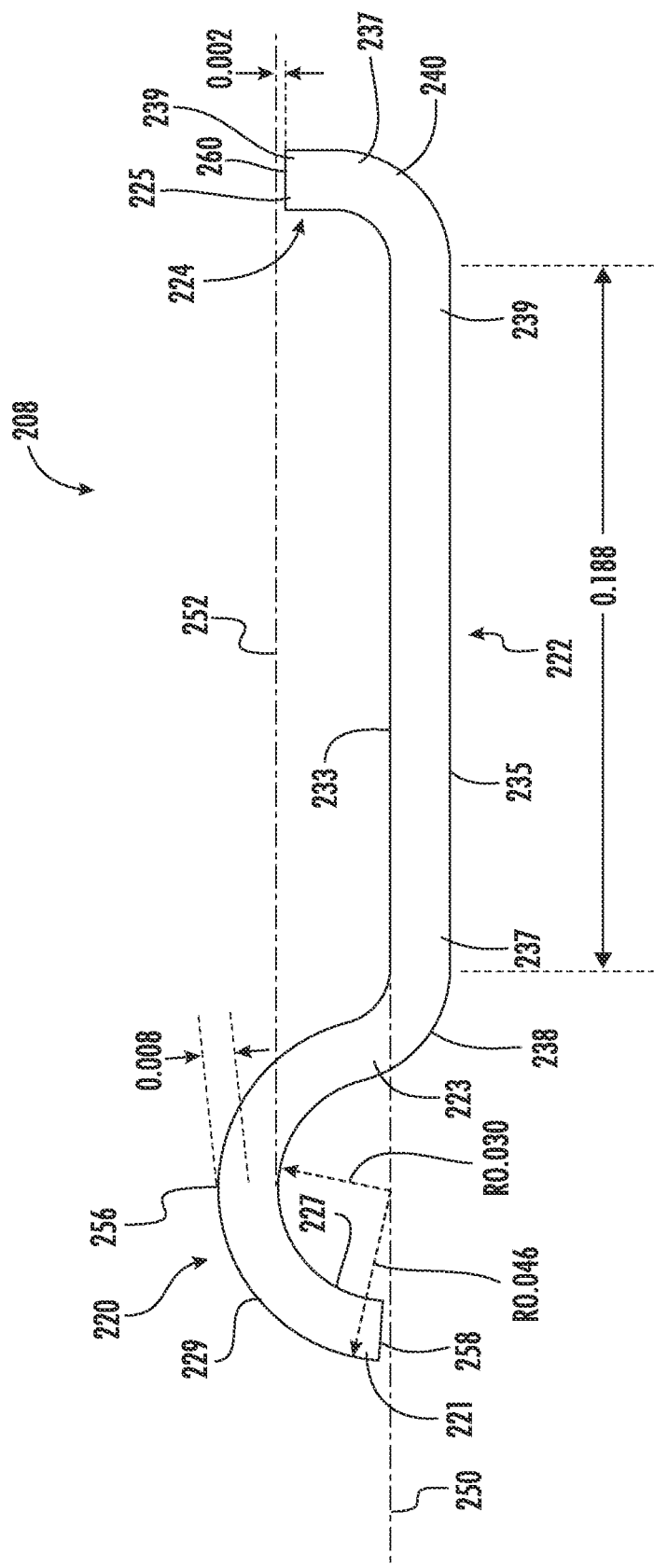
FIG. 6 is a side cross-sectional view of an example revolution of a metal sheath according to embodiments of the present disclosure.

FIG. 6 demonstrates a non-limiting example revolution 208 in greater detail.

Although only a single revolution is shown, it will be appreciated that revolution 208 may be one of a plurality of revolutions helically wound about one or more conductors to form a metal sheath, which may be substantially the same or similar to the metal sheath 105 of the assembly 100 described herein. As shown, the revolution 208 may include a first section 220 connected to a second section 222, and a third section 224 connected to the second section 222. The first section 220 may include a first end 221 and a second end 223, and a first surface 227 opposite a second surface 229. The first section 220 may have a constant radius between the first end 221 and the second end 223. Although non-limiting, a first radius along the first surface 227 may be 0.030 and a second radius along the second surface 229 may be 0.046". In other embodiments, the first and/or second radius may vary between the first end 221 and the second end 223. It will be appreciated that the first radius and the second radius may vary in other embodiments. For example, the first radius may be between 0.01 and 0.1 inches, and the second radius may be between 0.02 and 0.2 inches. The second radius may vary based on a thickness of the first section 220.

The second section 222 may include a first end 237 and a second end 239, and a first surface 233 opposite second surface 235. The third section 224 may include a first end 237 and a second end 239, wherein the second end 239 may correspond to a free end 225 of the third section 224. The second end 223 of the first section 220 may connect to the first end 237 of the second section 222 at a first inflection point 238, while the second end 239 of the second section 222 may connect to the first end 237 of the third section 224 at a second inflection point 240. In the embodiment shown, the first, second, and third sections 220, 222, 224 have a constant thickness. Although non-limiting, the thickness may be 0.016", a helix pitch may be 0.270", a strip length may be 0.375", and a length of the second section 222 may be 0.188". Therefore, the length of the second section 222 may be at least two times as large as the diameter of the first section 220 in the non-limiting embodiment shown. It will be appreciated that the thickness of the metal sheath 205 and the length of the second section 222 may vary in other embodiments. For example, the thickness may be between 0.005 and 0.6 inches, while the length of the second section 222 may be between 0.05 and 0.7 inches.

As shown, the revolution 208 may include a first axis 250 corresponding to a plane defined by the first surface 233 of the second section 222, and a second axis 252 defined by a plane that touches or intersects the first surface 227 of the first section 220 at an apex 256 (in the orientation shown). The first axis 250 may be parallel to the second axis 252. The second section 222 may extend generally parallel to the first axis 250 and to the second axis 252. The free end 225 of the third section 224 may extend generally perpendicular to the first axis 250 and to the second axis 252. In the non-limiting embodiment shown, the first end 221 of the first section 220 does not extend to or past the first axis 250, and the second section 239 of the third section 224 does not extend to or past the second axis 252. For example, an end surface 260 of the free end 225 may be approximately 0.002" away from the second axis 252 to permit movement of the revolution 208. Furthermore, a plane defined by an end surface 258 of the first section 220 may be oriented at a non-zero angle relative to the first axis 250 to increase movement, while a plane defined by the end surface 260 of the free end 225 may be oriented substantially parallel to the second axis 252.

Figure 7A:
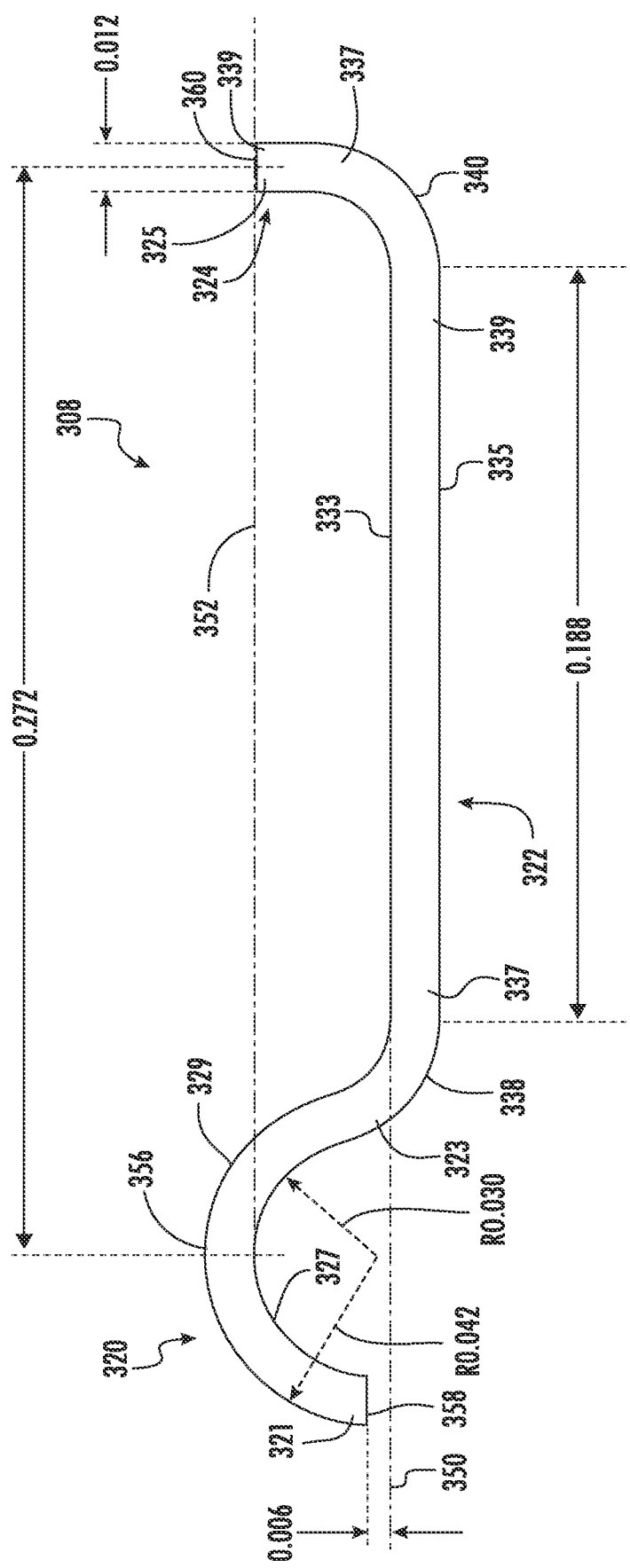
FIGS. 7A-7B are side cross-sectional views of an example revolution and metal sheath according to embodiments of the present disclosure.
Figure 7B:
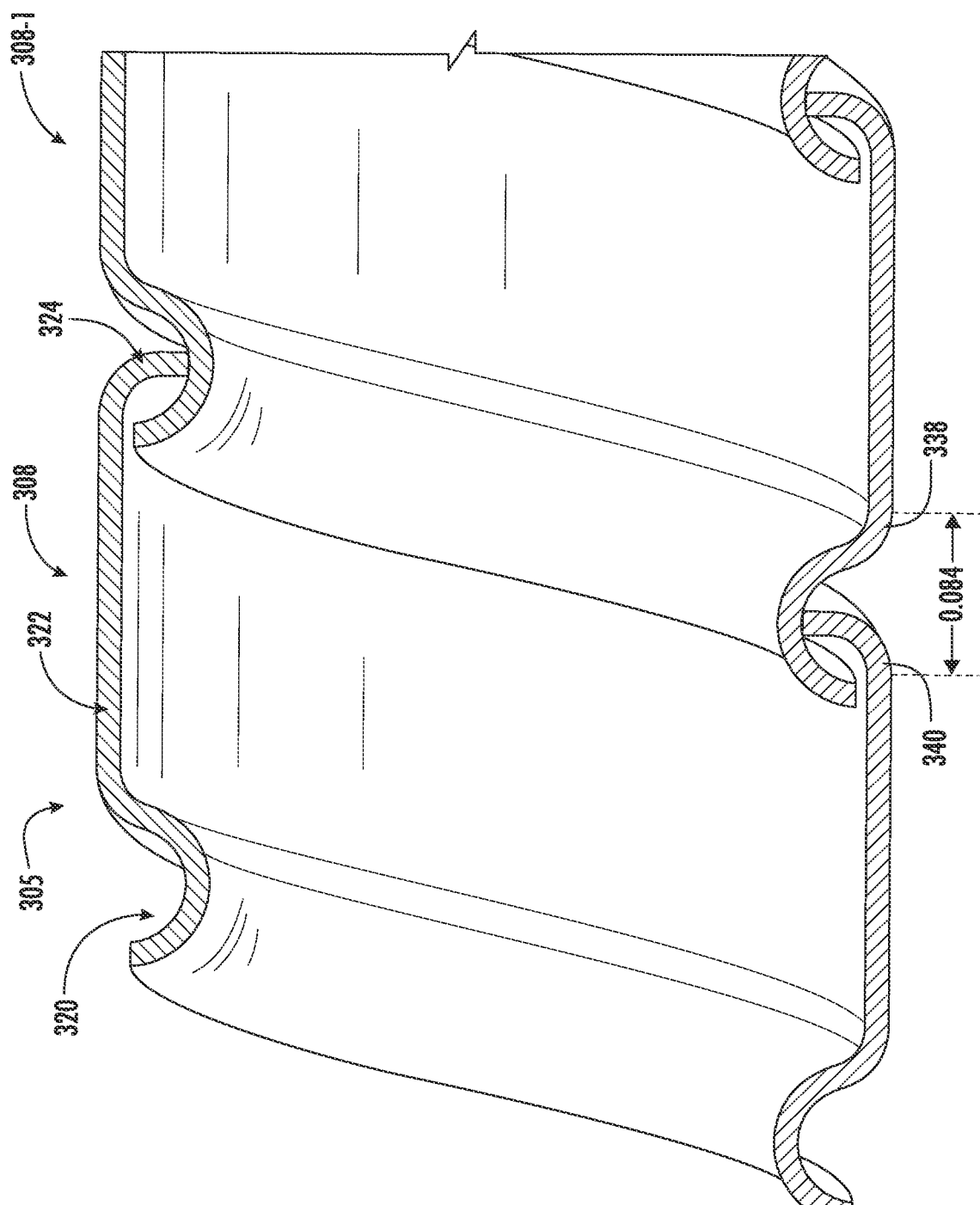

FIGS. 7A-7B demonstrate a non-limiting example revolution 308 of a metal sheath 305 in greater detail. As shown, the revolution 308 may include a first section 320 connected to a second section 322, and a third section 324 connected to the second section 322. As best shown in FIG. 7A, the first section 320 may include a first end 321 and a second end 323, and a first surface 327 opposite a second surface 329. The first section 320 may have a constant radius between the first end 321 and the second end 323. Although non-limiting, a first radius along the first surface 327 may be 0.030" and a second radius along the second surface 329 may be 0.042". In other embodiments, the first and/or second radius may vary between the first end 321 and the second end 323. It will be appreciated that the first radius and the second radius may vary in other embodiments. For example, the first radius may be between 0.01 and 0.1 inches, and the second radius may be between 0.02 and 0.2 inches. The second radius may vary based on a thickness of the first section 320.

The second section 322 may include a first end 337 and a second end 339, and a first surface 333 opposite a second surface 335. The third section 324 may include a first end 337 and a second end 339, wherein the second end 339 may correspond to a free end 325 of the third section 324. The second end 323 of the first section 320 may connect to the first end 337 of the second section 322 at a first inflection point 338, while the second end 339 of the second section 322 may connect to the first end 337 of the third section 324 at a second inflection point 340. In the embodiment shown, the first, second, and third sections 320, 322, 324 may have a constant thickness. Although non-limiting, the thickness may be 0.012", a helix pitch may be 0.272", a strip length may be 0.375", and a length of the second section 322 may be 0.188". The helix pitch is a distance between the apex 356 of the first section 320 and a midpoint of an end surface 360 of the free end 325. In some embodiments, the length of the second section 322 is at least two times as large as the diameter of the first section 320. It will be appreciated that the thickness of the metal sheath 205 and the length of the second section 322 may vary in other embodiments. For example, the thickness may be between 0.005 and 0.6 inches, while the length of the second section 322 may be between 0.05 and 0.7 inches.

As further shown, the revolution 308 may include a first axis 350 corresponding to a plane defined by the first surface 333 of the second section 322, and a second axis 352 defined by a plane that touches or intersects the first surface 327 of the first section 320 at the apex 356 (in the orientation shown). The first axis 350 may be parallel to the second axis 352. The second section 322 may extend generally parallel to the first axis 350 and to the second axis 352. The free end 325 of the third section 324 may extend generally perpendicular to the first axis 350 and to the second axis 352. In the non-limiting embodiment shown, the first end 321 of the first section 320 does not extend to or past the first axis 350, and the second end 339 of the third section 324 does not extend to or past the second axis 352. For example, an end surface 358 of the first section 320 may be approximately 0.006" away from the first axis 350. Furthermore, a plane defined by the end surface 358 of the first section 320 may be substantially parallel to the first axis 350, while a plane defined by the end surface 360 of the free end 325 may be oriented substantially parallel to the second axis 352.

As best shown in FIG. 7B, a valley width (VW) between the second inflection point 340 of revolution 308 and the first inflection point 338 of revolution 308-1 may be 0.084". Therefore, the length of the second section 322 may be at least two times as large as VW when the metal sheath 305 is in a linear configuration. Furthermore, the helix pitch may be at least three times as large as VW when the metal sheath 305 is in the linear configuration. It will be appreciated that VW may vary in other embodiments. For example, VW may be between 0.03 and 0.3 inches.

FIGS. 8A-8B demonstrate a non-limiting example revolution 408 of a metal sheath 405 in greater detail. As shown, the revolution 408 may include a first section 420 connected to a second section 422, and a third section 424 connected to the second section 422. As best shown in FIG. 8A, the first section 420 may include a first end 421 and a second end 423, and a first surface 427 opposite a second surface 429. The first section 420 may have a constant radius between the first end 421 and the second end 423. Although non-limiting, a first radius along the first surface 427 may be 0.040", while a second radius along the second surface 429 may be 0.074". In other embodiments, the first and/or second radius may vary between the first end 421 and the second end 423. It will be appreciated that the first radius and the second radius may vary in other embodiments. For example, the first radius may be between 0.01 and 0.1 inches, and the second radius may be between 0.02 and 0.2 inches. The second radius may vary based on a thickness of the first section 420.

The second section 422 may include a first end 437 and a second end 439, and a first surface 433 opposite a second surface 435. The third section 424 may include a first end 437 and a second end 439, wherein the second end 439 may correspond to a free end 425 of the third section 424. The second end 423 of the first section 420 may connect to the first end 437 of the second section 422 at a first inflection point 438, while the second end 439 of the second section 422 may connect to the first end 437 of the third section 424 at a second inflection point 440. In the embodiment shown, the first, second, and third sections 420, 422, 424 may have a constant thickness. Although non-limiting, the thickness may be 0.034", a helix pitch may be 0.372", a strip length may be 0.50", and a length of the second section 422 may be 0.265". The helix pitch is a distance between the apex 456 of the first section 420 and a midpoint of an end surface 460 of the free end 425. In some embodiments, the length of the second section 422 is at least two times as large as the diameter of the first section 420. It will be appreciated that the thickness of the metal sheath 405 and the length of the second section 422 may vary in other embodiments. For example, the thickness may be between 0.005 and 0.6 inches, while the length of the second section 422 may be between 0.05 and 0.7 inches.

As further shown, the revolution 408 may include a first axis 450 corresponding to a plane defined by the first surface 433 of the second section 422, and a second axis 452 defined by a plane that touches or intersects the first surface 427 of the first section 420 at the apex 456 (in the orientation shown). The first axis 450 may be parallel to the second axis 452. The second section 422 may extend generally parallel to the first axis 450 and to the second axis 452. The free end 425 of the third section 424 may extend generally perpendicular to the first axis 450 and to the second axis 452. In the non-limiting embodiment shown, the first end 421 of the first section 420 may extend nearly to the first axis 450, and the second end 439 of the third section 424 may nearly extend to the second axis 452. For example, an end surface 458 of the first section 420 and an end surface 460 of the third section 424 may be approximately 0.002" away from the first axis 450 and second axis 452, respectively. Furthermore, a plane defined by the end surface 458 of the first section 420 may be oriented at a first non-zero angle relative to the first axis 450, while a plane defined by the end surface 460 of the free end 425 may be oriented at a second non-zero angle relative to the second axis 452. In various embodiments, the first and second non-zero angles may be the same or different.

As best shown in FIG. 8B, a valley width (VW) between the second inflection point 440 of revolution 408 and the first inflection point 438 of revolution 408-1 may be 0.107". Therefore, the length of the second section 422 may be approximately 2.5 times as large as VW when the metal sheath 405 is in a linear configuration. Furthermore, the helix pitch may be approximately 3.5 times as large as VW when the metal sheath 405 is in the linear configuration. It will be appreciated that VW may vary in other embodiments. For example, VW may be between 0.03 and 0.3 inches.

FIG. 9 demonstrates a non-limiting example metal sheath 505 in greater detail. As shown, each revolution 508 and 508-1 may include a first section 520 connected to a second section 522, and a third section 524 connected to the second section 522. In various embodiments, the first section 520 may have a constant or varied radius along its length. Although non-limiting, a first radius along a first surface (outer facing) of the first section 520 may be 0.030", while a second radius along a second surface (inner facing) may be 0.050". It will be appreciated that the first radius and the second radius may vary in other embodiments. For example, the first radius may be between 0.01 and 0.1 inches, and the second radius may be between 0.02 and 0.2 inches. The second radius may vary based on a thickness of the first section 520.

Furthermore, a helix pitch may be 0.39" and a length of the second section 522 may be 0.3131". It will be appreciated that the length of the second section 522 may vary in other embodiments. For example, the length of the second section 522 may be between 0.05 and 0.7 inches. In some embodiments, the length of the second section 522 may be between two and five times as large as the diameter of the first section 520.

A valley width (VW) between a second inflection point 540 of revolution 508 and a first inflection point 538 of revolution 508-1 may be 0.0769". Therefore, the length of the second section 522 may be between two and four times as large as Vw when the metal sheath 505 is in a linear configuration. Furthermore, the helix pitch may be between two and five times as large as VW when the metal sheath 505 is in the linear configuration. It will be appreciated that VW may vary in other embodiments. For example, VW may be between 0.03 and 0.3 inches.

Figure 10:
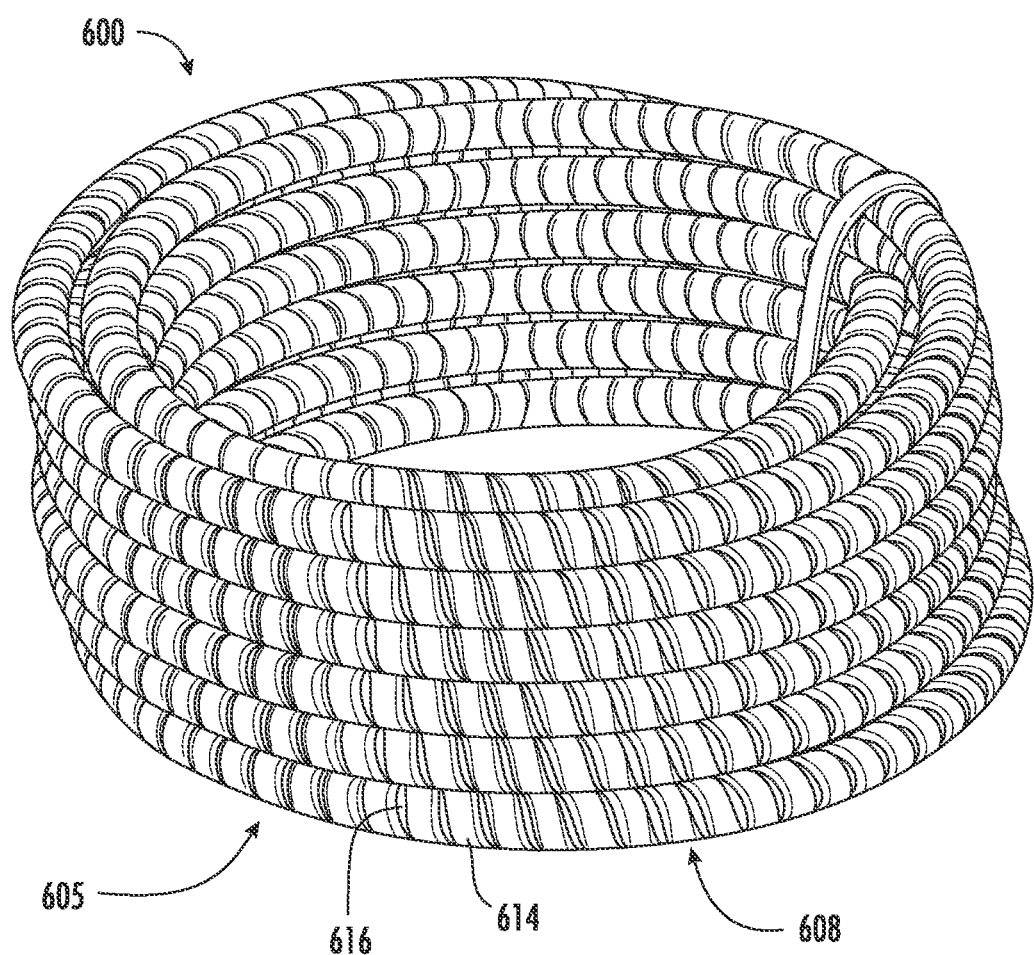
FIG. 10 demonstrates an MC cable assembly according to embodiments of the present disclosure.

FIG. 10 demonstrates a coil of an MC cable assembly (hereinafter "assembly") 600 according to embodiments of the disclosure. The assembly 600 may the same or similar to any of the MC cable assemblies described herein. Assembly 600 may include a metal sheath 605 formed from a flat or shaped metal strip, the edges of which are helically wrapped and interlock to form a series of revolutions 608. Each of the revolutions 608 includes a series of peaks 614 and valleys 616. The profile of the metal sheath 605 allows the resulting assembly 600 to have a desired bend radius for compact and efficient packaging. For example, when arranged as a series of loops in a coil configuration, e.g., as shown, the metal sheath 605 may have a minimum bend radius between three and fifteen times an overall diameter of the metal sheath 605.

Figure 11:
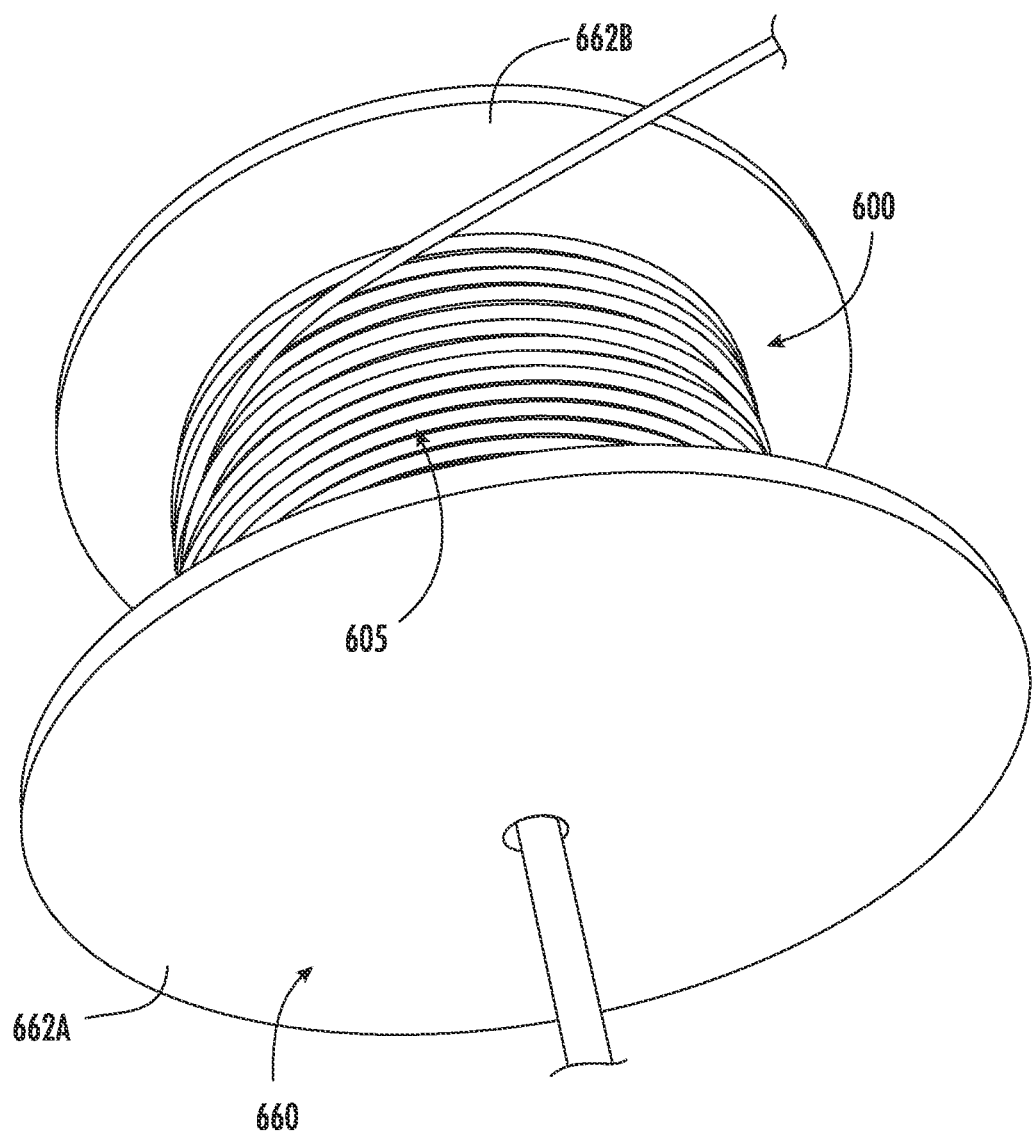
FIG. 11 demonstrates an MC cable assembly in use with a reel according to embodiments of the present disclosure.

Furthermore, due to the exterior profile of the metal sheath 605, such as a length of the peaks 614 being at least three times as large as the valleys 616, nesting of the peaks 614 and the valleys 616 of adjacent loops of the metal sheath 605 when stacked upon one another can be minimized, thus making it easier for the assembly 600 to be unwound for use. This may be similarly true when the assembly 600 is dispensed from a reel 660, as demonstrated in FIG. 11. As known, the reel 660 may include a central body about which the metal sheath 605 is wound, and one or more flanges 662A and 662B on opposite sides of the central body. As the metal sheath 605 is pulled, the reel 660 rotates to dispense the metal sheath 605 therefrom. The profile of the metal sheath 605 allows the various loops of the metal sheath 605 to slide over/atop one another as the metal sheath 605 is being pulled. Because the valleys 616 and peaks 614 are less likely to nest or get caught with one another, the assembly 600 can more quickly and consistently be unwound for use during installation.

Figure 12A:
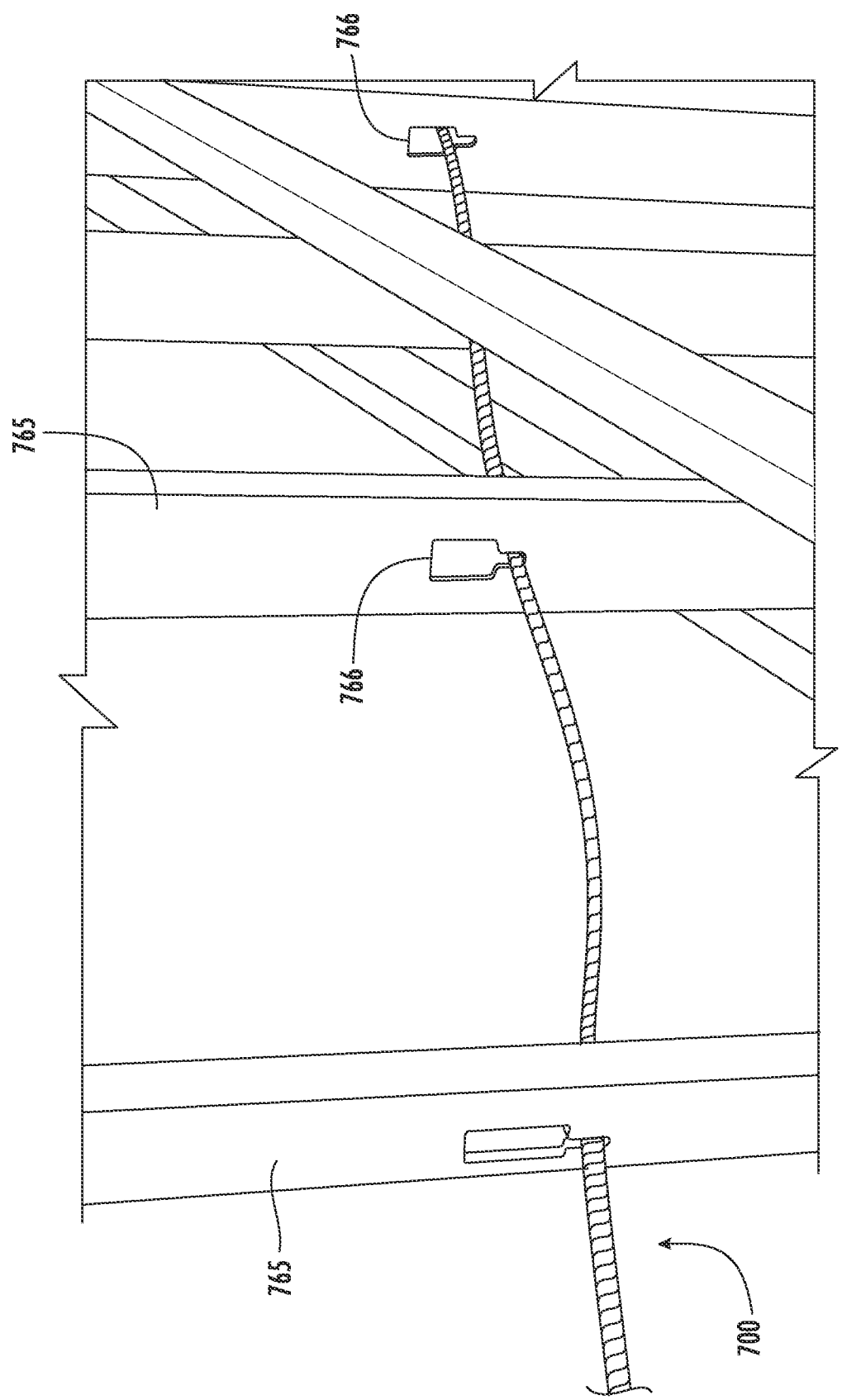

Another advantage of the MC cable assemblies described herein is demonstrated in FIGS. 12A-12B. Oftentimes MC cable is suitable for use in commercial and industrial settings having a plurality of support structures 765, such as metal framing studs, including one or more cable openings 766 formed therein. Although not a requirement, MC cable may be installed after the rough-in phase of locating and setting all boxes and enclosures, wherein rough-in occurs when all the interior and exterior walls are framed but before the sheet rock or other finishing material is installed. As better shown in FIG. 12B, the cable openings 766 may include a larger upper section 777 and a relatively smaller bottom section 778. It will be appreciated that other differently sized/shaped cable openings 766 are possible. During installation, an installer may pass an MC cable assembly 700 through the cable openings 766, as desired. As a result, peaks 714 and valleys 716 of the metal sheath 705 may drag or brush against an interior edge 770 of the cable openings 766. The MC cable assembly 700 may be the same or similar to the MC cable assemblies described herein.

In general, as the length of the MC cable assembly 700 increases so does the required pulling force. In contrast to prior art MC cable assemblies, which include larger valleys between revolutions and more pronounced peaks, the outer profile of the MC cable assembly 700 may include a flattened peak (e.g., second section) 714 along the outermost radial portion of the metal sheath 705 and relatively narrow valleys 716 between the peaks 714 to decrease engagement between the outer surface of the metal sheath 705 and the interior edge 770 of the cable openings 766. Furthermore, due to the proportions of the length of the flattened peak 714 to the diameter of the first section and to a width of the valleys 716, excessive hang-ups and audible noise ("chatter") are reduced during installation of the metal sheath, leading to decreased installer fatigue and increased installation efficiency. The exterior profile of the metal sheath 705 allows the MC cable assembly 700 to more easily glide through the support structures 765.

Furthermore, in some cases it may be desirable to bend or fold the MC cable assembly 700, for example, to wrap around a corner or stud. The metal sheath 705 of the MC cable assembly 700 has increased configurability due to the tighter bend radius. As recited above, the MC cable assembly 700 may have a minimum bend radius between three and fifteen times an overall diameter of the metal sheath 705 while still meeting performance crush requirements for MC cables. For example, MC cables assemblies of the present disclosure may withstand greater than 1000 lbf. In the case the MC cable assembly 700 has a diameter of 0.5", the bend radius may be as tight as 1.5". Embodiments herein are not limited in this context.

Figure 13:
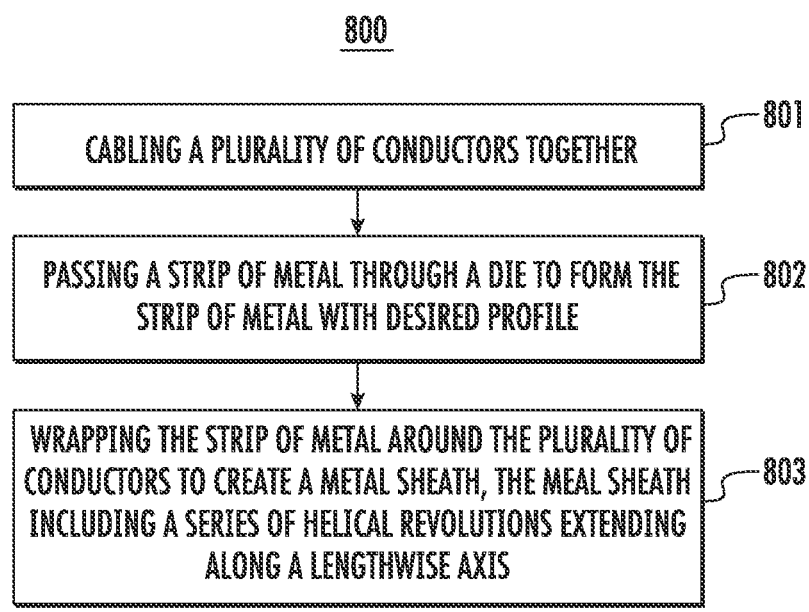
FIG. 13 is a flowchart of a method for forming an MC cable according to embodiments of the present disclosure.

FIG. 13 is a flowchart of a method 800 for forming a MC cable according to embodiments of the present disclosure. At a block 801, the method 800 may include cabling a plurality of conductors together. In various embodiments, the conductors may be twisted or laid parallel to one another. In other embodiments, a single conductor is provided.

At block 802, the method 800 may include passing a single continuous strip of metal through a die or other similar machine to form the strip of metal with a desired profile. In some embodiments, the metal sheath may be formed to include a first section connected to a second section, and a third section connected to the second section. In some embodiments, more than one strip of metal may be used.

At block 803, the method 800 may include wrapping the strip of metal around the plurality of conductors to create a metal sheath, the metal sheath comprising a series of helical revolutions extending along a lengthwise axis. In some embodiments, at least two helical revolutions of the series of helical revolutions each include a first section having a curved profile, wherein the curved profile extends into an interior cavity of the metal sheath, and a second section extending from the first section, the second section extending along the lengthwise axis. In some embodiments, the second section may extend parallel to the lengthwise axis. The at least two helical revolutions of the series of helical revolutions may each further include a third section extending from the second section, the third section including a free end terminating within a recess defined by a first section of an adjacent helical revolution of the series of helical revolutions, wherein the first section and the second section connect at a first inflection point, wherein the second section and the third section connect at a second inflection point, and wherein a length of the second section is at least two times as large as a distance between the second inflection point and the first inflection point of the adjacent helical revolution of the series of helical revolutions when the metal sheath is in a linear configuration. In some embodiments, the length of the second section is at least three times as large as the distance between the second inflection point and the first inflection point of the adjacent helical revolution of the series of helical revolutions.

In some embodiments, the helically wrapping may include arranging the series of helical revolutions such that the free end of the third section extends past a plane defined by a bottom most point of the first section of the adjacent helical revolution. In some embodiments, the helically wrapping further includes arranging the series of helical revolutions such that the free end of the third section is in abutment with an inner surface of the first section of the adjacent helical revolution. In some embodiments, the helically wrapping further includes arranging the series of helical revolutions such that the second section is oriented co-planar with a second section of the adjacent helical revolution when the metal sheath is in the linear configuration.

Although the illustrative method 800 is described as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be necessary to implement a methodology in accordance with the present disclosure.

Although non-limiting, cables of the present disclosure may be appropriate for commercial, industrial, multi-residential branch circuits and feeder wiring, services for power, lighting, control and signal circuits. Furthermore, cables of the present disclosure may be exposed or concealed, fished, surface mounted, embedded in plaster, used in environmental air-handling spaces, used in open or messenger supported aerial runs, used in dry locations, used in hazardous locations to Class I & II Div. 2 and Class III, Div. 1 & 2 (per NEC® Articles 501, 502, 503, 530, etc.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A metal sheath for housing a plurality of conductors, the metal sheath comprising a continuous strip of metal having a plurality of revolutions extending along a lengthwise axis, a first revolution of the plurality of revolutions comprising:
   a first section having a semicircular profile extending into an interior cavity of the metal sheath;
   a second section extending from the first section, wherein a length of the second section is larger than a diameter of the first section; and
   a third section extending from the second section, the third section terminating within a recess defined by a semicircular profile of a first section of an adjacent revolution of the plurality of revolutions such that the first revolution and the adjacent revolution interlock,
   wherein the first section and the second section of the first revolution connect at a first inflection point, wherein the second section and the third section of the first revolution connect at a second inflection point, wherein the adjacent revolution has a second section extending from the first section, wherein the first section and the second section of the adjacent revolution connect at a first inflection point of the adjacent revolution, wherein a distance between the second inflection point of the first revolution and the first inflection point of the adjacent revolution defines a valley, and wherein the valley is open to an exterior of the metal sheath.

2. The metal sheath of claim 1, wherein the second section extends parallel to the lengthwise axis.

3. The metal sheath of claim 1, wherein the distance between the second inflection point of the first revolution and the first inflection point of the adjacent revolution is less than the diameter of the first section of the first revolution when the metal sheath is in a linear configuration.

4. The metal sheath of claim 3, wherein the length of the second section of the first revolution is at least three times as large as the distance between the second inflection point of the first revolution and the first inflection point of the adjacent revolution when the metal sheath is in the linear configuration.

5. The metal sheath of claim 1, wherein the second section of the first revolution comprises one or more flat outer surfaces and one or more curved outer surfaces.

6. The metal sheath of claim 1, wherein the second section of the first revolution comprises an outer surface having a dip extending towards the interior cavity of the metal sheath.

7. A metal sheath comprising a single, continuous metal strip wound in a series of helical revolutions extending along a lengthwise axis, at least one helical revolution of the series of helical revolutions comprising:
   a first section having a semicircular profile extending into an interior cavity of the metal sheath;
   a second section extending from the first section, wherein the second section extends parallel to the lengthwise axis, and wherein a length of the second section is larger than a diameter of the first section; and
   a third section extending from the second section, the third section terminating within a recess defined by a semicircular profile of a first section of an adjacent helical revolution of the series of helical revolutions, wherein the first section and the second section of the at least one helical revolution connect at a first inflection point, and wherein the second section and the third section of the at least one helical revolution connect at a second inflection point, wherein a distance between the first and second inflection points defines a portion of a valley, and wherein the portion of the valley is open to an exterior of the metal sheath.

8. The metal sheath of claim 7, wherein the length of the second section of the at least one helical revolution is at least 1.25 times as large as the diameter of the first section of the at least one helical revolution.

9. The metal sheath of claim 7, wherein the second section of the at least one helical revolution comprises one or more flat outer surfaces and one or more curved outer surfaces.

10. The metal sheath of claim 7, wherein the second section of the at least one helical revolution comprises an outer surface having a dip extending towards the interior cavity of the metal sheath.

11. A metal sheath comprising a continuous metal strip wound about a lengthwise axis in a series of convolutions, a first convolution of the series of convolutions comprising:
    a first section having a semicircular profile, wherein the semicircular profile is concave relative to the lengthwise axis;
    a second section extending from the first section at a first inflection point, the second section extending parallel to the lengthwise axis, wherein a length of the second section is larger than a diameter of the first section; and
    a third section extending from the second section at a second inflection point, the third section terminating within a recess defined by a semicircular profile of a first section of an adjacent convolution of the series of convolutions, wherein the adjacent convolution further comprises a second section connected to the first section at a first inflection point of the adjacent convolution, wherein the diameter of the first section of the first convolution is greater than a distance between the second inflection point of the first convolution and the first inflection point of the adjacent convolution, wherein the distance between the second inflection point of the first convolution and the first inflection point of the adjacent convolution defines a portion of a valley, and wherein the portion of the valley is open to an exterior of the metal sheath.

12. The metal sheath of claim 11, wherein the length of the second section of the first convolution is at least 1.25 times as large as the diameter of the first section of the first convolution.

13. The metal sheath of claim 11, wherein the second section of the first convolution comprises one or more flat outer surfaces and one or more curved outer surfaces.

14. The metal sheath of claim 11, wherein the second section of the first convolution comprises an outer surface having a dip extending towards the lengthwise axis.

* * * * *